(12) United States Patent
Routt

(10) Patent No.: US 8,190,553 B2
(45) Date of Patent: May 29, 2012

(54) METHODS AND SYSTEMS FOR QUANTUM SEARCH, COMPUTATION AND MEMORY

(76) Inventor: Thomas J. Routt, Seattle, WA (US)

(*) Notice: Subject to any disclaimer, the term of this patent is extended or adjusted under 35 U.S.C. 154(b) by 748 days.

(21) Appl. No.: 12/337,076

(22) Filed: Dec. 17, 2008

(65) Prior Publication Data

US 2009/0164435 A1    Jun. 25, 2009

Related U.S. Application Data

(60) Provisional application No. 61/008,480, filed on Dec. 20, 2007, provisional application No. 61/008,863, filed on Dec. 21, 2007.

(51) Int. Cl.
*G06F 15/00* (2006.01)
*G06F 15/18* (2006.01)

(52) U.S. Cl. .................................................... 706/62

(58) Field of Classification Search ............... None
See application file for complete search history.

(56) References Cited

U.S. PATENT DOCUMENTS

| | | | |
|---|---|---|---|
| 5,768,297 A | 6/1998 | Shor | |
| 6,081,882 A | 6/2000 | Gossett | |
| 6,285,999 B1 | 9/2001 | Page | |
| 6,317,766 B1 | 11/2001 | Grover | |
| 7,451,292 B2 | 11/2008 | Routt | |
| 2004/0078421 A1* | 4/2004 | Routt | 709/201 |
| 2004/0258421 A1* | 12/2004 | Conti et al. | 398/183 |
| 2006/0208311 A1* | 9/2006 | Tomita | 257/321 |

OTHER PUBLICATIONS

'An exceptionally simple theory of everything': Lisi, 2007, arxiv:0711.0770v1.*
'Is Quantum Machanics an island in Theoryspace': Aaronson, 2004, arxiv:quant-ph/0401062v2.*
'Matter waves and orbital quantum numbers': Ellman, 1998, arxiv preprint physics/9809003.*
'Fifty years of quantum theory': Sommerfeld, 1951, promo.aaas.org/kn_marketing/pdfs/fifty_years_quantum_theory.pdf.*
Albert, R., H. Jeong, & Barabase, A. (1999). Diameter of the World-Wide Web. Nature, 401, 130.
Boyer, M., Brassard, G., Hoyer, P., & Tapp, A. (1998). Tight Bounds on Quantum Searching. Progress of Physics, 46, 493-505; PhysComp96; arXiv:quantt-ph/9605034 v1, May 23, 1996, 8 pp.
Brickman, K.A., P.C. Haljan, P.J. Lee, M. Acton, L. Deslauriers, & Monroe, C. (2005). Implementation of Grover's Quantum Search Algorithm in a Scalable System. Physical Review A 72, 0503006-1-0503006-4.
Duplij, S.A. And Shapoval, I.I. (2007). Quantum Computations: Fundamentals and Algorithms. Problems of Atomic Science and Technology (PAST), 3(1), 230-235.

(Continued)

*Primary Examiner* — Kakali Chaki
*Assistant Examiner* — Peter Coughlan
(74) *Attorney, Agent, or Firm* — Edwards Wildman Palmer LLP; Scott D. Wofsy; George N. Chaclas

(57) ABSTRACT

A system for performing multi-dimensional quantum search, quantum computation, quantum memory, quantum storage, and quantum retrieval includes a structure and method for: enabling components and systems for quantum search, and more particularly to improved local and remote quantum computing and search components and systems; quantum memory component and systems; quantum storage components and systems; quantum retrieval components and systems; quantum logic gates; classical (non-quantum) search components and systems; integrated quantum-classical search components and systems; and integrated quantum-classical cryptosystems.

23 Claims, 10 Drawing Sheets

OTHER PUBLICATIONS

Farhi, E. & Gurmann, S. (1998). Quantum Computation and Decision Trees. Phys. Rev. A, 58, 915-928; arXiv:quant-ph/9706062v2, Mar. 20, 1998, 28 pp.

Grover, L.K. (2005). A Different Kind of Quantum Search. arXiv:quant-ph/0503205v1, Mar. 28, 2005, 13 pp.

Grover, L.K. (1996). A Fast Quantum Mechanical Algorithm for Database Search. Proceedings, STOC 1996, 212-219.

Grover, L.K. (2001). From Schrödinger's Equation to the Quantum Search Algorithm. arXiv:quant-ph/0109116, Sep. 22, 2001, 16 pp.

Grover, L.K. (1997). Quantum Computers Can Search Arbitrarily Large Databases by a Single Query. Physical Review Letters, 79 (23), Dec. 7, 1997, pp. 4709-4712.

Grover, L.K. (1998). Quantum Computers Can Search Rapidly by Using Almost Any Transformation. Physical Review Letters, 80, 4329-32.

Grover, L.K. (1997). Quantum Mechanics Helps in Searching for a Needle in a Haystack. Bell Labs, 4 pp.

Hayes B. (2006). Reverse Engineering. American Scientist, 2, 107.

Hogg, T. (2004). Adiabatic Quantum Computing for Random Satisfiability Problems. arXiv:quant-ph/0206059 v2, Jan. 23, 2004, 8 pp.

Hogg, T. & Portnov, D. (2006). Quantum Optimization. arXiv:quant-ph/0006090 v1 Jun. 20, 2000, 11 pp.

Jones, J.A., M. Mosca, M & Hansen, R.H. (1998). Implementation of a Quantum Search Algorithm on a Nuclear Magnetic Resonance Quantum Computer. Nature, 393 (6683), 344; arXiv:quant-ph/9805069v1, May 22, 1998, 6 pp.

Lisi, A.G. (2007). An Exceptionally Simple Theory of Everything. arXiv:hep-th/0711.0770v1, Nov. 6, 2007, 30 pp.

Lloyd, S. & Braunstein, S.L. (1999). Quantum Computation over Continuous Variables. Physical Review Letters, 82 (8), 1784-1787.

Lloyd, S. (1999). Quantum Search Without Entanglement. arXiv:quant-ph/9903057v1, Mar. 16, 1999, 9 pp.

Lloyd, S. (2000). Ultimate Physical Limits to Computation. Nature, 406, Aug. 31, 2000, 1047-1054.

Lopez, G.V., T. Gorin & Lara, L. (2007). Simulation of Grover's Quantum Search Algorithm in a Ising Nuclear Spin Chain Quantum Computer with First and Second Nearest Neighbour Couplings. arXiv:quant-ph/0710.3196v1, Oct. 16, 2007, 10 pp.

Maurer, S.M., T. Hogg, & Huberman, B.A. (2006). Quantum Portfolios. arXiv:quant-ph/0105071 v2, Jun. 22, 2001, 12 pp.

Meyer, D.A. (2000). Sophisticated Quantum Search Without Entanglement. Physical Review Letters, 85 (9), 2014-2017.

Nielsen, M.A., & Caves, C.M. (1997). Reversible Quantum Operations and Their Application to Teleportation. Physical Review Letters A, 55(4), 2547-2556; arXiv:quantu-ph/9608001v1, Aug. 1, 1996.

Roland, J. & Cerf, N.J. (2003). Adiabatic Quantum Search Algorithm for Structured Problems. Physical Review A 68, 062312-1-062312-7.

Roland, J. & Cerf, N.J. (2003). Quantum-Circuit Model of Hamiltonian Search Algorithms. Physical Review A 68, 062311-1-062311-6.

Roland, J. & Cerf, N.J. (2002). Quantum Search by Local Adiabatic Evolution. Phys. Rev. A, 65, 042308; arXiv:quant-ph/0107015v1 Jul. 3, 2001, 4 pp.

Routt, T.J. & Ketterling, J.A. (1998). Securing VPNs: An Architectural Approach. Business Communications Review, Oct. 1998, 51-56.

Steffen, M., W. van Dam, T. Hogg, G. Breyta, & Chuang, I. (2003). Experimental Implementation of an Adiabatic Quantum Optimization Algorithm. arXiv:quant-ph/0302057 v2, Feb. 14, 2003, 5 pp.

Tulsi, T., L.K. Grover, & Patel, A. (2006). A New Algorithm for Fixed Point Quantum Search. arXiv:quant-ph/0505007v3 Mar. 22, 2006, 12 pp.

Tulsi, A. (2007). Quantum Computers Can Search Rapidly by Using Almost Any Selective Transformations. arXiv:quant-ph/0711.4299v1, Nov. 27, 2007, 8 pp.

Viamontes, G.F., I.L. Markov, & Hayes, J.P., Is Quantum Search Practical?, 8 pp.

Wu, X. & Duan, R. (2007). Exact Quantum Search by Parallel Unity Discrimination Schemes. arXiv:quant-ph/0709.3627v2, Oct. 6, 2007, 7 pp.

Zalka, C. (2006). Grover's Quantum Searching Algorithm Is Optimal. arXiv:quantph/9711070v2, Dec. 2, 1999, 13 pp.

Zalka, C. (2008). Shor's Algorithm with Fewer (Pure) Qubits. arXiv:quant-ph/0601097v1, 1-12; arXix:quant-ph/0601097v1, Jan. 15, 2006, 12 pp.

Feynman, R.P. Quantum Mechanical Computers. Optics News Feb. 1, 1995, pp. 11-20; Cited in Feynman, R.P., Edited by T. Hey and R.W. Allen. Feynman Lectures on Computation. 1996, Westview, 303 pp.

Gilmore, R. Lie Groups, Lie Algebras, and Some of Their Applications. 2002, Dover Publications, Inc., 587 pp.

Kuipers, J.B. Quaternions and Rotation Sequences. 1999, Princeton University Press, 371 pp.

Langville, A.N. & Meyer, C.D. Google's PageRank and Beyond: The Science of Search Engine Rankings. 2006, Princeton University Press, 217 pp.

Mermin, A. D. Quantum Computer Science. 2007, Cambridge University Press, 220 pp.

Nielsen, M.A. & Chuang, I.L. Quantum Computation and Quantum Information. 2000, CaMbridge University Press, 676 pp.

Schneier, B. Applied Cryptography: Protocols, Algorithms, and Source Code in C. 1996, John Wiley & Sons, Inc., 758 pp.

Thouless, D.J. Topological Quantum Numbers in Nonrelativistic Physics. 1998, World Scientific Publishing Co. Pte. Ltd., 426 pp.

* cited by examiner

SOME SOLUTIONS FOR $\frac{dy}{dx} = y$

SOME SOLUTIONS FOR $\frac{dy}{dx} = x - y$

METHODS AND SYSTEMS FOR QUANTUM SEARCH, COMPUTATION AND MEMORY

CROSS-REFERENCE TO RELATED APPLICATIONS

This application claims priority to U.S. Provisional Patent Application No. 61/008,863 entitled Multi-dimensional Quantum Computation, Search and Memory, filed Dec. 21, 2007, and to U.S. Provisional Patent Application No. 60/008,480 entitled Methods For Quantum Cryptosystem, filed Dec. 20, 2007, each of which is incorporated herein by reference.

BACKGROUND OF THE INVENTION

1. Field of the Invention

The subject disclosure relates to components and systems for quantum computing, quantum search, and more particularly to improved quantum search components and systems; quantum computing components and systems; quantum memory components and systems; quantum storage components and systems; quantum retrieval components and systems; classical (non-quantum) search components and systems; integrated quantum-classical computing components and systems; integrated quantum-classical search components and systems; and integrated quantum-classical cryptosystems.

2. Background

Fundamental Limits to Classical Computation

Computing and networking are evolving to quantum expressions. Quantum computing is emerging as the natural outcome of computer miniaturization and performance trends pervading hardware and software components and systems. In order to continue to enhance computer and network throughput and application availability to meet local- and global-scale information requirements, the following must be addressed: components, subsystems and systems must continue to support higher clock frequencies within shrinking chip geometries and diminishing memory latencies; and logic, components, subsystems and systems need to be more energy efficient, while avoiding serial architecture bottlenecks and resistance-capacitance delays, issues that are only temporarily addressed within classical (non-quantum) parallel processing platforms.

Exponential improvements in component miniaturization, memory, processor power and marginal cost improvement trends are yielding single-atom bit and single electron transistor (SET) computing environments. Component reduction and logic speed increase cannot continue beyond single-atom bit and SET levels while remaining wholly within the realm of classical space-time physics due to quantum effects that pervade the molecular, atomic and sub-atomic scales.

It is becoming increasingly necessary to use quantum effects to read bits from and write bits to the memory registers of nano-scale (molecular scale, $10^{-9}$ meter), ångström-scale (atomic scale, $10^{-10}$ meter) pico-scale (electronic and photonic scale, $10^{-12}$ meter), and sub-pico-scale computing components, subsystems and systems. However, classical (non-quantum) approaches to computer technology fabrication and operation increasingly encounter fundamental issues in terms of size, component proximity, energy, and heat dissipation that are projected to increasingly interfere with error-free operation of electronic, photonic, and opto-electronic components, logic circuits and systems intrinsic to nano-, ångström-, pico, and sub-pico scales.

Fundamental limits to classical (non-quantum) computing include: the number of atoms required to store one bit in a mass memory device reaches one; the number of dopant atoms in a transistor reaches one; machining and fabrication technologies attain a resolution of one atomic diameter; and the energy dissipated by a single logic operation reaches kT for T=300 kelvins (where k is Boltzmann's constant, T is temperature, and 300 kelvins is ambient room temperature), approximately the energy of a single air molecule at ambient room temperature.

Erasure of one bit of information in a classical computing environment dissipates approximately ln (natural logarithm) 2×kT energy, or $2.9 \times 10^{21}$ joules, equal to the kinetic energy of a single air molecule at ambient room temperature. Classical computers effectively "erase" one bit of information each time they perform a logic operation, rendering nearly all classical logic operations effectively irreversible.

Continuing improvements in computer performance require commensurate reductions in the energy dissipated by each logic operation. Two alternative approaches to logic operation energy dissipation improvement include: improve the efficiency with which information is erased; and perform reversible logic operations that do not erase information and therefore dissipate arbitrarily little heat.

Referring to FIG. 1, a graph 10 of energy per logic computation from the 1940s to 2020 is shown. The energy cost of computing—as measured in joules per logic operation—must decrease dramatically to enable computer performance improvement to maintain its exponential growth. The data in FIG. 1 were originally developed by Rolf Landauer in 1988 and updated by Brian Hayes in the March-April 2006 issue of *American Scientist*. Computational energy levels will soon encounter one electron-volt—160 zeptojoules—the energy of a single electron at a potential of one volt.

The reference to kT ln 2 in the graph 10 of FIG. 1 expresses a fundamental computational thermodynamic floor of approximately three zeptojoules. To function beneath this threshold, computational logic operations are compelled to operate reversibly, one of the hallmarks of quantum computation.

Of all the candidate technologies that continue to scale beyond the current classical era, quantum logic has one unique feature—it is not contained by classical space-time physics. Moore's law is exponential; any classical approach demands exponential increases in space or time. Even the Avogadro's number of elements in a molecular computer is quickly limited by the size of the exponential problem.

Underlying Foundation to Quantum Computing

Fundamental force particles emerging from the Unified Field include: (1) Photons for the Electromagnetic Force; (2) Bosons for the Weak Force; (3) Gluons for the Strong Force; and (4) Gravitons for the Gravitational Force. Fundamental bases to quantum (and ultimately classical) computer and network systems are fermions and bosons. Electrons are fermions; photons are bosons.

Fermions—named after the Italian physicist Enrico Fermi—and Fermi-matter fields reside at Atto- ($10^{-18}$ m) through Zepto-scales ($10^{-21}$ m) and are the elementary particle basis to electronic computing and networking. There are ultimately 24 fermionic elementary particles plus bosonic elementary particles that mediate the four fundamental physical forces. Fermions have ½-integer spin and cannot be in the same state due to the Pauli exclusion principle.

Electronic computing and networking is ultimately fermion-based, where $N_8$ (general octad space) must be either 0 or 1 because there cannot be more than one fermion in a single state. This is shown by the Fermi-Dirac distribution equation below as Equation 1:

$$\langle N_S \rangle = \frac{\sum_{N_S=0}^{1} N_S e^{-\beta E_S N_S + \beta \mu N_S}}{\sum_{N_S=0}^{1} e^{-\beta E_S N_S + \beta \mu N_S}}$$

$$= \frac{0 + e^{-\beta E_S + \beta \mu}}{1 + e^{-\beta E_S + \beta \mu}}$$

$$= \frac{1}{e^{\beta(E_S - \mu)} + 1}.$$

Equation 1

⇐ Where +1 is the quantum difference which arises due to particle indistinguishableness $N$ = number of particles $S$ = macroscopic quantum state $\mu$ = *Fermion* chemical potential Bosons—named after the Indian physicist Satyendra Bose—and Bose-force fields reside at Atto- ($10^{-18}$ m) through Zepto-scales ($10^{-21}$ m), have integer spin, and can share the same state. Photons are bosons, particles whose spin is a whole number. Optical computing and networking are ultimately boson-based, where, for bosons, the sum over $N_S$ runs from 0 to ∞, as shown in the Bose-Einstein distribution equation below as Equation 2:

$$\langle N_S \rangle = \frac{\sum_{N_S=0}^{\infty} N_S e^{-\beta E_S N_S + \beta \mu N_S}}{\sum_{N_S=0}^{\infty} e^{-\beta E_S N_S + \beta \mu N_S}}$$

$$= \frac{\sum_{N_S=0}^{\infty} N_S C^{N_S}}{\sum_{N_S=0}^{\infty} C^{N_S}} \quad (C \equiv e^{-\beta E_S + \beta \mu})$$

$$= \frac{C \frac{d}{dC} \sum_{N_S=0}^{\infty} C^{N_S}}{\sum_{N_S=0}^{\infty} C^{N_S}}$$

$$= \frac{C \frac{d}{dC}(1-C)^{-1}}{(1-C)^{-1}}$$

$$= \frac{C(1-C)^{-2}}{(1-C)^{-1}}$$

$$= \frac{1}{C^{-1} - 1}$$

$$= \frac{1}{e^{\beta(E_S + \mu)} - 1}.$$

Equation 2

⇐ Where −1 is the quantum difference which arises due to particle indistinguishableness $N$ = number of particles $S$ = macroscopic quantum state $\mu$ = *Boson* chemical potential The final result to the Bose-Einstein distribution (Equation 2) differs from that of the Fermi-Dirac distribution (Equation 1) by the presence of minus and plus signs, respectively, in the non-exponent portion of the denominator. Bosons and fermions tend to generate canceling quantum-mechanical contributions. When the quantum jitters of a boson are positive, those of a fermion tend to be negative, and vice versa. Since supersymmetry ensures that bosons and fermions occur in pairs, substantial cancellations occur from the outset—cancellations that ultimately calm the apparently frenzied quantum effects.

Emergence of Quantum Information Theory and Quantum Computation

Dr. Richard P. Feynman, Richard Chace Tolman Professor of Theoretical Physics at the California Institute of Technology (CalTech) and 1965 Nobel Laureate in Physics for work in quantum electrodynamics, provided initial descriptions of quantum computation in an interdisciplinary course he presented at CalTech in conjunction with John Hopfield and Carver Mead during 1981 through 1986. The 1982/83 course handout provided an overview in areas that included a primer on computation, computability and information theory, with sections entitled "Limits on Computation Arising in the Physical World" and "Fundamental Limits on Computation." During the fall of 1983, Feynman presented a course at CalTech entitled "Potentials and Limitations of Computing Machines."

Feynman's lecture courses set out to explore the limitations and potentials of computers and covered topics including Turing machines, Shannon's theorem and information theory, reversible computation, thermodynamics, limitations on computers due to quantum mechanics, and quantum computation. Feynman presented an analysis of quantum mechanical computers at a meeting in Anaheim, Calif. in June 1984, subsequently published in *Optics News* during February 1985.

During the same period—in 1981—Gerd Binnig and Heinrich Rohrer at IBM Zürich developed scanning tunneling microscopy (STM) for which they shared the Nobel Prize in Physics in 1986. STM probes densities of states of materials using a quantum tunneling current, resolves at better than 0.1 nanometer (nm) laterally and 0.01 nm in depth, operates at temperatures ranging from near zero degrees Kelvin to a few hundred degrees Celsius, and can be used equally effectively in vacuum, air, gas, and liquid ambient environments.

STM imagery during the past quarter century reveals the degree of precision to which individual atoms and electrons can be physically manipulated and positioned, as shown at the IBM STM Image Gallery, IBM Research, Almaden Research Center.

Parallel developments in information theory and applied computation during the past quarter century have ushered in the era of quantum computation, impelling the foundation for equally precise manipulation, positioning, and use of quantum logic.

Quantum computing and networking accesses Hilbert space, the one exponential resource previously untapped for computation, and provides a development foundation that promises to ensure continuing advancement of Information Technology (IT), one of the world's leading economic sectors.

Quantum computation is based on the principles of quantum physics. Quantum computers, in various stages of early development, operate according to the rules of quantum mechanics governing the world of the very small—the waves and particles intrinsic to the nano-, ångström-, pico-scales, and sub-pico scales.

Quantum computers are projected to operate in truly parallel and "real-time" fashion, with both sequential and simultaneous processing built into their very nature. Quantum processing simultaneity ensures that all computational pathways are pursued at once as compared to serial processing of discrete tasks found in conventional computers. In other words, each quantum operation acts on all system states simultaneously. Therefore, one "quantum machine" cycle, one "tick of the quantum computer clock," could theoretically compute all possible machine states at once.

Information Search

Information search, storage and retrieval using a plurality of quantum and integrated quantum-classical methods provides a fundamental application breakthrough basis to sustained advances in the above fields and to a plurality of other fields of computational endeavour, due to the inextricable interlinkage of related information emerging from prior structured and unstructured interrelationships and non-dependencies.

Pre-Web Search and Retrieval

Information search and retrieval within pre-World Wide Web (Web) environments is fundamentally constrained to searches within small, controlled, non-linked collections. Four examples of non-linked, computerized (pre-Web) search approaches include Boolean models, vector space models, probabilistic models, and meta-search models—adopted during the 1960s through 1980s—and improved upon through the 2000s.

Boolean model-based searching seeks to exactly match retrieved documents to user queries and employs Boolean algebra, whereby search words are logically combined with Boolean operators such as AND, OR, and NOT. The Boolean AND of two logical statements x and y dictates that both x and y must be satisfied; the Boolean OR of the same two logical statements requires that at least one of the statements must be satisfied.

The three Boolean operators (AND, OR, NOT) can also be combined, generating the net result that candidate documents are determined to be relevant or irrelevant with no concept of partial match between queries and documents.

Boolean engines employing 'fuzzy' Boolean logic often categorize documents as somewhat relevant. Two commonly encountered issues with Boolean search and retrieval are synonymy (multiple words having the same meaning) and polysemy (single words having multiple meanings).

Vector space model-based searching, developed by Gerard Saltan during the early 1960s, transforms textual data into numeric vectors and matrices, and employs matrix analysis to discover key features and connections in retrieved document collections. Latent semantic indexing (LSI), a particular vector space model, accesses the hidden semantic structure within document collections and returns documents whose keywords are semantically related.

Advantages associated with vector space models include relevance scoring and relevance feedback, where retrieved documents are ordered in a list according to the document relevance score, generally as a percentage of relevance.

Vector space information retrieval models are relatively compute-intensive however, and do not scale well due to their inherent requirement to compute distance measures between queries and documents. More recent vector space model-based searching techniques, such as LSI, require singular value matrix decomposition while representing the entire document collection.

Probabilistic search models seek to estimate the probability that requesting users will determine retrieved documents to be relevant. Retrieved documents are ranked by the ratio of probability that they are relevant to the query, divided by the probability that they are not. The major disadvantage associated with probilistic search models—complexity limit scalability—is a disadvantage shared with vector space models.

Meta-search models seek to combine the approaches and benefits of Boolean, vector space, and probabilistic search models, and direct queries to multiple search engines at once, returning search results to the search requester within one unified list.

Classical (Non-Quantum) Search and Retrieval

Web-based information search and retrieval is tantamount to search and retrieval within the planet's largest linked document collection. Searching the World Wide Web has been likened to tracing connections among friends and acquaintances within social networks.

Web search engine elements include query-independent crawler modules, page repositories, indexing modules, and indexes, as well as query-dependent elements such as query modules and ranking modules, the latter (ranking module) elements initiated in "real time" response to queries.

Examples of web page ranking modules include two classic link analysis systems called hypertext induced topic search (HITS), developed by Jon Kleinberg while at IBM Almaden in Silicon Valley, and PageRank, developed by Sergey Brin and Larry Page while at Stanford University (now at Google). A common feature to both HITS and PageRank is utilization of the Web's hyperlink structure in terms of a massive directed graph.

Web graph nodes represent webpages and directed arcs or links represent hyperlinks. Hyperlinks into a given webpage are called inlinks and point into nodes; hyperlinks pointing out from a given node are called outlinks. One central PageRank thesis is that a webpage is important to the degree to which it is pointed to by other important webpages, whereas the HITS method uses both inlinks and outlinks to create webpage popularity scores for each given webpage.

A central PageRank equation is $[\pi^T = \pi^T(\alpha S + (1-\alpha)E)]$, see U.S. Pat. No. 6,285,999 for related information, which incorporates a primitivity adjustment $[G = \alpha S + (1-\alpha)1/n\ ee^T]$, where $\alpha$ is a scalar between 0 and 1 and G is the present Google matrix. In this model, $\alpha$ is a parameter that controls the proportion of time a random Web surfer follows hyperlinks as opposed to teleporting.

Suppose $\alpha = 0.6$. Then 60 percent of the time a random Web surfer follows the hyperlink structure of the Web and the other 40 percent of the time the random surfer teleports to a random new page. Teleporting is random because the teleportation matrix $E = 1/n\ ee^T$ is uniform, meaning the surfer is equally likely, when teleporting, to jump to any page.

To handle dangling nodes (nodes dangling, e.g., pdf files, image files, data tables), the $0^T$ rows of a hyperlink matrix (H) are replaced with $1/ne^T$, thereby making H stochastic (and primitive). As a result, the random surfer, after entering a dangling node, is able to hyperlink to any page at random.

A primitive matrix is both irreducible and aperiodic. Therefore, the stationary vector of the chain (PageRank vector in the Google case) exists, is unique, and can be found by a simple power iteration.

Connections between any two people within the world population have been shown to be linked by a chain of five or six acquaintances, giving rise to a feature of social networks known as "six degrees of separation," after John Guare's Broadway play and movie based on studies published in 1967 by Stanley Migram, a Harvard sociologist. Social networks are grouped in small clusters, representing circles of friends and acquaintances in which each node (person) is connected to all other nodes through no greater than six links.

The World Wide Web, personal networks, power grid networks, and the human brain alike, exhibit small node separation and display high degrees of clustering. Initial models of the World Wide Web based on finite size scaling by Albert-Laszlo Barabasi and others at Notre Dame during 1998 predicted the shortest path between two pages selected at random among an estimated 800 million nodes (documents) to be 19 (the size of the Web was estimated during 1999 to be at least $8 \times 10^8$ documents in terms of a large directed graph whose vertices are documents and whose edges are links, URLs).

The existence of six, or even 19 degrees of separation within social or Web networks respectively, suggests that items are easy to locate in a small world. However, search problems quickly become intractable when constrained to classical (non-quantum) computing and networking technologies.

For example, the average number of links on any given Web document is seven, meaning that seven links can be followed from the first page, 49 documents are two clicks away, 343 documents are three clicks away, and so forth.

On this basis, nodes located 19 degrees away from the search request origin require searching through $10^{16}$ documents, approximately 10 million ($10^7$) times greater than the estimated number of pages on the Web. While several links encountered in this example search point back to previously viewed pages, even one second used to check single documents would require greater than 300 million ($300 \times 10^8$) years to view all documents within 19 clicks.

Social and Web separation of 6 and 19 degrees respectively, are diminishing in scale, primarily due to the evolution of the Web itself. Web searching techniques do not require "brute force" analysis of all possible links due to use of contextual link interpretation, creating an increasing number of logical paths with widely different limits between any two people or objects of interest.

Web search evolution may have already effectively reduced separation between any two people in the world to three degrees, leading to highly interrelated and clustered "small worlds." However, weak link connections outside of clustered small worlds, coupled with rapid increases in requirements for multi-contextual searches, rapidly exceed the capacities of massively parallel classical computing search engines and algorithms.

Quantum Search

Quantum search problems can generally be formulated in terms of an oracle $f(x)$ that equals 1 (unity) for arguments x that solve the problem of interest, where x may be, for example, a pair of integers, $f(x)$ a check for prime factors. Alternatively, x may be database entries and $f(x)$ a test for answers to a query.

Lov Grover (1996) showed that a quantum computer can solve a quantum search problem searching for N possibilities in $O(\sqrt{N})$ steps ('O' is variously referred to as Big Oh notation, Landau notation, Bachmann-Landau notation, or asymptotic notation), as applied to searching in an unsorted database containing N items, one of which is marked, where the objective is to locate the unknown marked item by accessing the database a minimum number of times. Whereas classically, an average of N/2 (0.5N) items must be tested before finding the correct one, Graver's quantum search algorithm performs the same task with a complexity order of $O(\sqrt{N})$ steps, giving rise to a quadratic speed up relative to classical search techniques.

Grover also showed that it is possible for quantum mechanical systems to render interaction-free measurements by making use of the duality properties of photons, whereby the presence or absence of an object of inquiry can be deduced by allowing a small probability of a photon interacting with the object.

Classical searches for $p=10^9$ for example, require calculation of $\sqrt{(p-x^2)}$ for nearly $10^6$ x to achieve a reasonable chance of success. Grover's procedure can theoretically achieve a probability of success extremely close to 1 (unity) by calling the quantum subroutine that evaluates $\sqrt{(p-x^2)}$ fewer than $10^3$ times. In general, Grover's search algorithm provides an improvement over random (classical) testing by a factor of $1/\sqrt{N}$.

Grover's search algorithm relies on a subroutine that operates on different numbers from a list of $2^n$ candidates until it produces the output 1 (unity), and calculates $f$ in the form of a unitary transformation—$Uf$—that acts on an n-Qbit input register that contains x, as well as a 1-Qbit register that is or is not flipped from 0 to 1, depending upon whether x is or is not the special number a as shown be Equation 3 below:

$$Uf(|x\rangle_n |y\rangle_1) = |x\rangle_n |y \oplus f(x)\rangle_1 \qquad \text{Equation 3}$$

In essence, Grover's search algorithm applies the product WV multiple times to the input register, taken initially to be in the standard state $|\phi\rangle$ where: (1) $|\phi\rangle\langle\phi|$ is the projection operator on the standard state $|\phi\rangle$; (2) V is linear and acts on a general superposition $|\Psi\rangle = \Sigma_x(|x\rangle\langle x|\Psi\rangle$ of computational basis states; (3) V changes the sign of the component of the state along $|a\rangle$,while leaving unchanged the component orthogonal to $|a\rangle$, as $V|\Psi\rangle = |\Psi\rangle - 2|a\rangle; a|\Psi\rangle$, generating $V=1-2|a\rangle\langle a|$, where $|a\rangle\langle a|$ is the projection operator on state $|a\rangle$; and (4) W is a unitary transformation that preserves the component of any state along the standard state $|\phi\rangle$ (uniform superposition of all possible inputs), while changing the sign of its component orthogonal to $|\phi\rangle$, to $W=2|\phi\rangle\langle\phi|-1$, where $|\phi\rangle\langle\phi|$ is the projection operator on the state $|\phi\rangle$.

Farhi and Gutmann (1998) addressed the concept of quantum computation viewed as a continuous time evolution, where they proposed an "analog" version of Grover's algorithm based on a time-independent Hamiltonian applied for a time T. The algorithm required T to be of order $\sqrt{N}$, providing the same degree of complexity as Grover's algorithm.

Farhi and Gutmann also considered an alternative class of continuous-time quantum algorithms based on a time-dependent Hamiltonian that effects an adiabatic evolution of the quantum register, where, if the Hamiltonian varies sufficiently slowly, the system will remain near its instantaneous ground state. In this approach, the adiabatic evolution can then be used to search gradually from an initial Hamiltonian—whose ground state is known—to a final Hamiltonian—whose ground state encodes the unknown solution. While the time required for this switching to remain globally adiabatic determines the computation time, unfortunately the search result is in a complexity of order N, which does not improve on a classical algorithm that simply checks all possible solutions.

Jeremie Roland and Nicolas J. Cerf (2002-2003) showed that the quadratic speed-up of Grover's original algorithm can be recovered by continuously adjusting the rate with which the initial Hamiltonian is switched to the final Hamiltonian (therein fulfilling the condition of adiabaticity locally, i.e., at each time). They further found that the local adiabatic-evolution approach improves the scaling law of the complexity of the quantum search algorithm by varying the speed of the adiabatic sweep. Generally, the global adiabatic evolution approach is based on a set of N items among which one is marked, with the objective being to locate it in minimum time, employing n quantum bits (qubits) to label the items, resulting in a Hilbert space of dimension $N=2^n$.

Hilbert space basis states are written as $|i\rangle$, with $I=0, \ldots, N-1$, while the marked state is written $|m\rangle$. Since $|\rangle$ is not known in advance, an initial superposition of all basis states is selected as the initial system Hamiltonian, $H_0 = I - |\Psi_0\rangle\langle\Psi_0|$, whose ground state is $|\Psi_0\rangle$ with energy zero. In essence, the algorithm consists in preparing the system in the state $|\Psi(0)\rangle = |\Psi_0\rangle$, then applying the Hamiltonian H(t) during a time T. By imposing a limit on the evolution rate, dividing T into infinitesimal time intervals dt, and applying the adiabaticity condition locally to each of these intervals, the evolution rate varies continuously in time, thereby speeding up the computation and solving Grover's problem, i.e., the search for a marked item in an unstructured database.

Christof Zalka (2006) showed that for any number of oracle lookups up to approximately $[\pi/4\sqrt{N}]$, Grover's quantum searching algorithm is reliable when searching for a marked item in an unstructured database, including for quantum algorithms that use measurements during the computation.

N. David Mermin (2007) noted that $Uf$ is the only unitary transformation appearing in Grover's algorithm that acts as anything other than the identity on the output register. Because the output register starts in the state $H|1\rangle$, unentangled with the input register, and because $Uf$ maintains the output register in this particular state, the output register remains unentangled with the input register and in the state $H|1\rangle$ throughout Grover's algorithm. $Uf$-centric descriptions of system behavior while retaining a 1-qubit output register maintains the following form as shown in Equation 4 below:

$$Uf(|\Psi\rangle \otimes H|1\rangle) = [|\Psi\rangle - 2|a\rangle\langle a|(|\Psi\rangle] \otimes H|1\rangle \qquad \text{Equation 4}$$

Mermin presented an improvement to Grover's algorithm by suppressing all explicit reference to the unaltered output register—which is always unentangled with the input register and always in the state $H|1\rangle$—by replacing the (n+1)-qubit unitary $Uf$ with the n-qubit unitary V that acts on the n-qubit input register, and defining all other operators that appear in the algorithm only by their action on the input register, with the implicit understanding that they act as the identity on the output register.

Quantum Search Limitations

As can be seen from the discussion above, quantum search can provide significant advantages over classical (non-quantum) search methods. Quantum search results are theoretically obtained more rapidly than by using classical search techniques, where objects of interest are marked items in unstructured data bases. However, the following quantum search limitations exist: (1) Quantum search methodologies and techniques have generally not been applied where objects of interest are unmarked items in unstructured or structured data bases; (2) Quantum search methodologies and techniques are generally constrained to local searches where objects of interest are marked items in unstructured data bases; these methodologies and techniques may not scale well in complex searches through distributed, unstructured data items, data bases, data repositories, and systems containing marked or unmarked items; (3) Initialization to superposition of present systems is generally obtained within O(log N) steps, a superposition-attainment velocity that may not scale within complex object searches through networked data elements, data files, data bases, and data repositories; (4) Quantum search results do not generate useable, reuseable, or updatable quantum search results indices; (5) Quantum search methodologies and techniques do not incorporate interaction with classical search, computational, and network systems; (6) Quantum search methodologies and techniques do not incorporate massively scalable quantum and hybrid quantum-classical memory; (7) The current state of quantum search does not lend itself to multi-dimensional search, storage and retrieval methodologies intrinsic to complex (real plus imaginary) numeric and non-numeric networked data elements, data files, data based, and data repositories existing in multiple dimensions; and (8) Quantum search methodologies and systems do not integrate quantum, classical, and steganographic cryptosystems.

Applications Implications for Improved Quantum Search

Application breakthrough implications for improved quantum and integrated quantum-classical search and computation are highly significant to continuing advances in a plurality of fields including, for example: Information search; Information security; Information processing; Information operations; Network-centric operations; Risk assessment, optimization, management; Multi-dimensional mathematics; Multi-dimensional modeling and simulation; Multi-dimensional, "real-time" decision support; Multi-dimensional epidemiologic pattern prediction; Civil outbreak prediction; Massively parallel e-discovery; Disease surveillance, outbreak prediction; Aerospace; Navigation; Transportation; Logistics; Meteorology; Design and manufacturing; Quantum, classical, and hybrid quantum-classical algorithm design; Resource optimization and allocation; Energy resource optimization; Financial market optimization; Mathematics—quantum algebra, quantum geometry; Quantum physics, quantum systems simulation; Cosmological physics modeling—mapping the cosmos; Molecular chemistry; Medicine; Biotechnology; Nanotechnology; Pico-, femto-, atto-, zepto-, yoctotechnologies; N-Yottabyte networked information storage, mapped arrays, indices; and Classically intractable problem resolution.

As can be seen from the discussion above, quantum search, computation, and retrieval can provide significant advantages over classical (non-quantum) methods. Therefore, there is a need for improved methods, components, and systems to allow utilizing the advantages that n-dimensional quantum search, computation, memory, storage, retrieval, and integrated cryptosystems can provide. Further, a requirement exists for improved integration of quantum and classical computation, search, memory and retrieval methods.

SUMMARY OF THE INVENTION

It should be appreciated that the present invention can be implemented and utilized in numerous ways, including without limitation as a process, an apparatus, a system, a device, and as a method for applications now known and later developed. These and other unique features of the system disclosed herein will become more readily apparent from the following description and the accompanying drawings.

It is therefore an object of the subject technology to provide a structure and method for enabling components and systems for quantum search, and more particularly to improved standalone and global network computing-centric quantum search components and systems; quantum memory components and systems; quantum storage components and systems; quantum retrieval components and systems; classical (non-quantum) search components and systems; and integrated quantum-classical search components and systems.

In a preferred embodiment, the subject technology may incorporate a plurality of quantum logic gates, memory registers, components, systems, and methods that are structured and function at a plurality of diminishing scales, for example: $10^{-6}$ m, the micron ($\mu$) scale, intrinsic to visible light-based transistors, capable of frequencies in the range $10^{14} \leq Hz \leq 10^{15}$; and $10^{-7}$ m, the sub-micron (0.1$\mu$) scale, intrinsic to extreme ultraviolet (EUV) transistors, where the wavelength ($\lambda$) is shorter than that of visible light and is capable of frequencies ranging from $10^{15}$ to $10^{16}$ Hertz ($10^{15} \leq Hertz \leq 10^{16}$). The $10^{-7}$ m scale is the spatial foundation for single- and multi-billion transistor chips; $10^{-9}$ meter (m), nano- or molecular-scale, intrinsic domain of molecular quantum computing, the realm of nanophotonics and nanoelectronics; $10^{-10}$ m, ångström or atomic scale, intrinsic domain of the single-atom bit; $10^{-12}$ m, electronic and photonic, or pico-scale, intrinsic domain of spintronics and the single electron transistor. The pico-scale is the intrinsic domain wherein an electron can tunnel across an insulator onto a conducting island if states are available to it on both sides, creating a periodic modulation called the Coulomb blockage in the charging current due to an integer number of electrons allowed on the island. The pico-scale is also the intrinsic scalar candidate to create a plurality of memory cells that each stores a single electron or photon; $10^{-15}$ m, femto-scale, characteristic length of the Strong Force, intrinsic to quantum computing and quantum networking due to the quantum properties of superposition and quantum entanglement (the latter, where the spins of particles polarized together remain correlated even if the particles are spatially separated); $10^{-18}$ m, atto-scale, characteristic length of the Weak Force; and $10^{-18}$ m to $10^{-31}$ m, scalar range intrinsic to the fermionic and bosonic domains. As stated in [Routt, U.S. Pat. No. 7,451,292, Methods For Transmitting Data Across Quantum Interfaces and Gates Using Same], the range of $10^{-18}$ m to $10^{-31}$ m scales is the elementary particle basis to electronic computing and electronic networking, and is the range of Fermi-matter fields, the fermionic domain. The scalar range of $10^{-18}$ m to $10^{-31}$ m is also the force field basis to optical computing and optical networking, and is the intrinsic domain of Bose-force fields, the bosonic domain.

In a preferred embodiment, the subject technology may incorporate a plurality of quantum logic gates, components, systems, and methods that are structured and function at a plurality of increasing scales, for example: $10^0$ m, one-meter scale, intrinsic to data and storage servers, providing the building block for local and global scale quantum search, storage, and retrieval components, sub-systems, and systems; $10^1$ m to $10^8$ m, the scalar range intrinsic to data and storage server arrays, data centers, local area networks (LANs, $10^3$ m), metropolitan area networks (MANs, $10^4$ m), regional Internet service providers (ISPs, $10^5$ m), national backbone network computing infrastructures ($10^6$ m), multinational backbone network computing infrastructures ($10^7$ m), and global network computing infrastructures ($10^8$ m); and $10^9$ m to $10^{13}$ m, the scalar range intrinsic to global network computing infrastructures incorporating a plurality of low earth orbit (LEO), medium earth orbit (MEO), geosynchronous orbit (GEO) and geostationary satellites, a plurality of combinations and permutations of earth planetary and/or satellite network computing ($10^9$ m); a plurality of earth planetary-lunar-satellite network computing ($10^{10}$ m), a plurality of quantum search, storage, retrieval network computing functions within and among earth planetary, solar, inner orbiting planetary network computing functions ($10^{11}$ m); and a plurality of intra-solar system, intra- and interplanetary network computing functions ($10^{13}$ m).

In a preferred embodiment, the subject technology may enable quantum logic gates in spin field effect (SFET) magnetic random access memory (MRAM) components, subsystems, and systems.

In a preferred embodiment, the subject technology may enable a quantum memory and data storage medium by incorporating a spin-dependent magnetic substrate integrated among a plurality of spin-neutral and spin-independent materials. Spin polarizations of component beam electrons and photons that are preferentially generated and captured by the quantum memory and data storage medium are determined by the combination of electronic/magnetic spin state and photonic angular direction.

The subject technology may contain spin decoherence by minimizing the duration of optical pulse and storage times. The subject technology may incorporate optical quantum information processing components, subsystems and systems, such as a dynamic form of temporally-independent, electromagnetically induced transparency (EIT). The subject technology may incorporate optical classical information processing components, subsystems and systems, utilizing EIT.

In a preferred embodiment, the subject technology may incorporate and integrate quantum and classical (non-quantum) algorithms, logic, components, sub-systems and systems. In a preferred embodiment, the subject technology may further incorporate non-locally-synchronized quantum computing, quantum search, quantum memory, quantum storage, and quantum retrieval indices that preferentially reference a plurality of data within a comparatively infinitesimal memory volume relative to the referenced data. The subject technology may enable classically intractable, n-degree scalable computing and search results in polynomial time.

In a preferred embodiment, the subject technology may enable a plurality of parallel dimensional computation and search, and pursue a plurality of presented computational and search pathways at once, in 'real-time.'

In a preferred embodiment, the subject technology may enable n-degree scalability in local and non-local quantum computation and search results storage.

In a preferred embodiment, the subject technology may enable n-degree scalability in local and non-local, integrated quantum-classical computation and search results storage. The subject technology may enable quantum logic. The subject technology may enable integrated quantum-classical logic.

In a preferred embodiment, the subject technology may enable integrated quantum-classical cryptosystems incorporating quantum, classical, and steganographic components and systems.

In a preferred embodiment, quantum computing and search functions in the subject technology may progress through pertubations of Schrödinger's equation in which: computational and search basis states are continuous and uniformly distributed in space; the actual state of a given particle $\Psi$ is expressed as a state vector specified in the form of a wavefunction $\Psi(x)$; $\Psi(x)$ denotes the amplitude in the state $|x\rangle$; x is a continuous variable rather than a set of discrete states $[|0\rangle, |1\rangle]$; evolution of the wavefunction $\Psi(x)$ is described by potential functions operating through a continuum; and therefore, there exists an infinite number of basis states.

In a preferred embodiment, the subject technology may incorporate quantum computation, search, storage and retrieval mechanics whereby current system states incorporate probabilistic memory throughout a plurality of system states based upon Markov processes defined with discrete and continuous states and time.

In a preferred embodiment, the subject technology may incorporate local and non-local quantum computation and quantum search platforms and logic.

In a preferred embodiment, the subject technology may incorporate quantum memory and data storage by n-dimensional generation and association of quantum search index results and identifiers, with a specific set of fermionic (electronic) and bosonic (photonic) quantum numbers, each associated with individually addressable quantum memory cells, and extensible throughout a plurality of time- and distance-independent regimes.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF THE PREFERRED EMBODIMENTS

Figure 1:
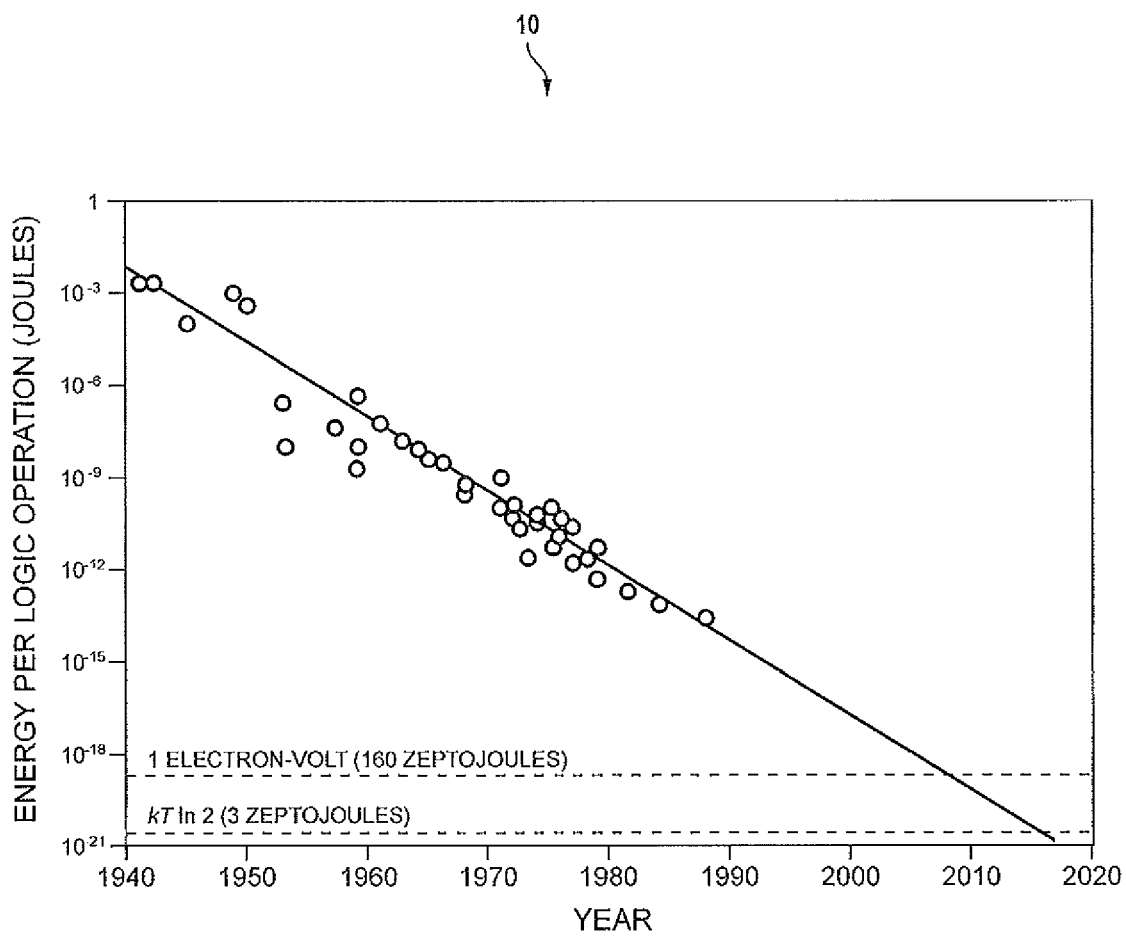
FIG. 1 is a somewhat schematic projection of encountering the classical computing thermodynamic floor.

The subject technology overcomes many of the prior art problems associated with implementing quantum search and integrated quantum-classical search. The advantages, and other features of the components disclosed herein, will become more readily apparent to those having ordinary skill in the art form. The following detailed description of certain preferred embodiments, taken in conjunction with the drawings, set forth representative embodiments of the subject technology, wherein like reference numerals identify similar structural elements.

For clarity throughout the following description, arrows are shown to indicate the direction and ellipses to indicate additional components; such shorthand is for clarity in reference to the figures and is not meant in a limiting sense.

Quantum Search and Integrated Quantum-Classical Search System

Figure 2:
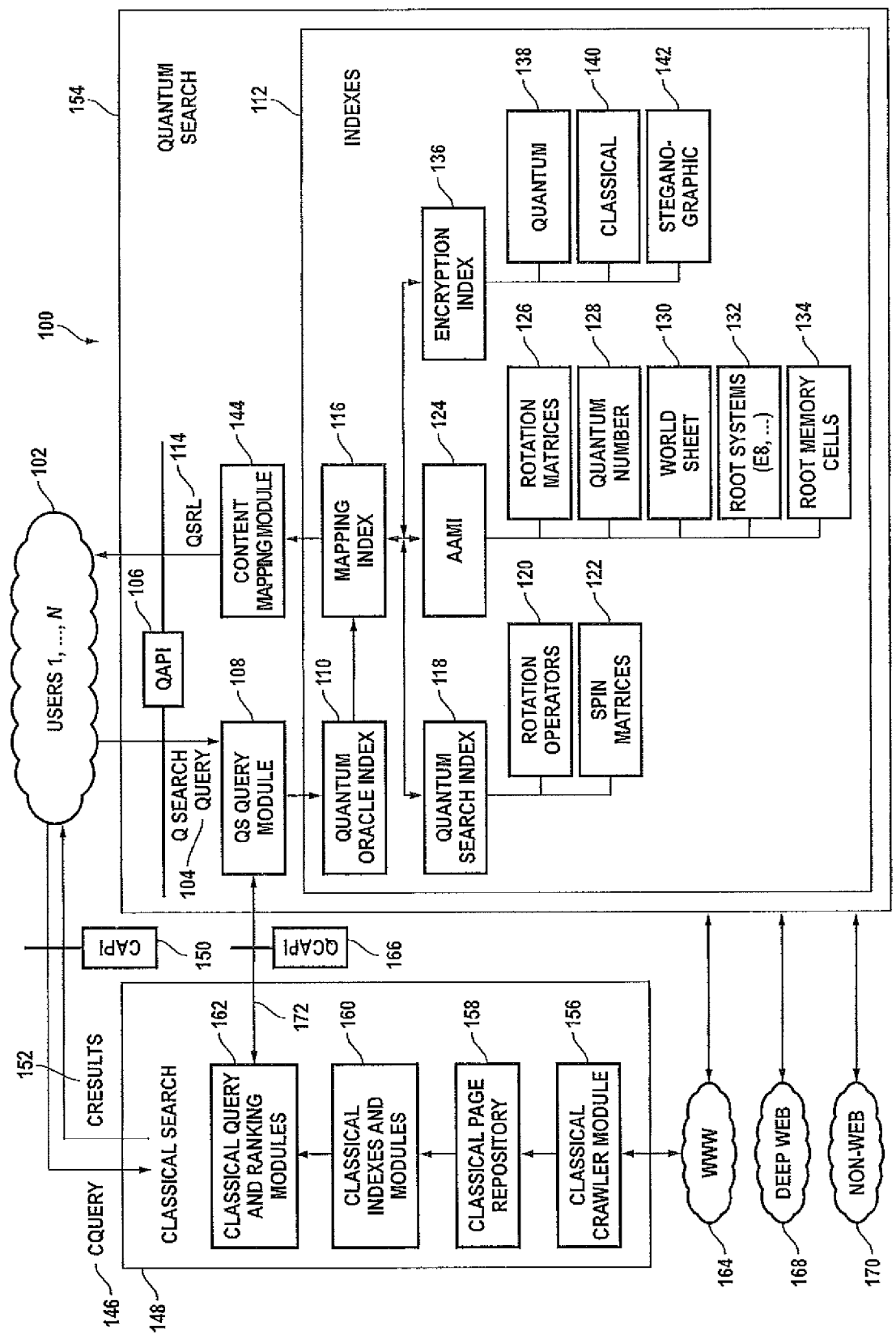
FIG. 2 is a somewhat schematic view of a quantum search, integrated quantum-classical search, and integrated cryptographic system in accordance with the subject technology.

FIG. 2 provides a view of an integrated quantum search and quantum-classical search system 100, preferentially comprising quantum search components, classical search components, and cryptosystem components, each accessible by a plurality of users 102, where the user interface to each (quantum or classical) search environment may be locally or remotely accessed by means of a computer. 'Computer,' as used herein, refers to any computational platform or run-time environment; 'computer access' refers to locally-resident and remotely-accessible quantum search, classical search, and integrated quantum-classical search components and systems.

Referring further to FIG. 2, the plurality of users 102 preferentially issue quantum search (QSearch) query requests 104 into a quantum search environment 154 across a quantum application programming interface (QAPI) 106 where the QAPI 106 formats and presents a plurality of Qsearch query requests 104 to a quantum search query module (QS query module) 108.

Qsearch query requests 104 are preferentially presented from a QS Query module 108 into a quantum oracle index 110 component within an Indexes environment 112, where the quantum oracle index 110 invokes a quantum search oracle. The quantum search oracle preferentially incorporates 'zero-point' quantum computation, search, storage and retrieval logic within a plurality of superposed quantum gaps, or computational singularities, stationed between and among any 2-to-n instances of a plurality of observable system states, any n of which connect logically and/or physically, as disclosed in terms of quantum gap logic in U.S. Pat. No. 7,451,292 entitled Methods For Transmitting Data Across Quantum Interfaces and Gates Using Same issued to Routt on Nov. 11, 2008.

Invocation of quantum gap logic for quantum search oracle operation in the subject technology preferentially enables a plurality of n-qubit quantum search oracles to operate within a plurality of self-referral computational, superpositional states throughout the execution of a plurality of quantum search algorithms, therein effectively stationing quantum search oracle logic within a state-continuous, dynamic, computationally aware fountainhead of past, present, and future instructions and outcomes. The quantum search oracle, computationally stationed within quantum gap logic, effectively remains unchanged throughout the sequence initialized by processing Qsearch requests 104, through to generation of a quantum search results list (QSRL) 114 within the quantum search system 100.

The quantum search oracle in the subject technology preferentially 'marks' a plurality of solutions to a plurality of QSearch queries 104 by phase-shifting search request solutions utilizing 'zero-point' self-referral computations in quantum gap logic that approaches infinite root ($\to \infty \sqrt{N/M}$) search iterations at hyper-exponentially convergent calculation velocities, where the search problem contains N possible items with M possible solutions. A quantum oracle index 110 in the subject technology is further preferentially generated upon completion of the search solution 'mark' process.

Still referring to FIG. 2, the quantum oracle index 110 preferentially invokes a mapping index 116 process which in turn: Generates a quantum search index 118, incorporating rotation operator components 120 and spin matrices components 122; Generates an addressable absolute memory index (AAMI) 124, incorporating rotation matrices 126, quantum number 128, world sheet 130, a plurality of root systems 132, and a plurality of root memory cell components 134; and Generates an encryption index 136, incorporating quantum encryption components 138, classical encryption components 140, and steganographic encryption components 142.

Referring further to FIG. 2, the mapping index 116 preferentially generates a content mapping module 144 which maps a QSRL 114 across the QAPI 106 to a plurality of users 102.

Referring further to FIG. 2, a plurality of users 102 preferentially issue classical query (CQuery) requests 146 into a classical search environment 148 across a classical application programming interface (CAPI) 150. Assuming that the CQuery requests 146 result in classical results (CResults) 152 and that no interaction with the quantum search environment 154 is required in order to obtain CResults 152, CQuery 146 requests yield Cresults 152 across the CAPI 150 as a function of successful search query processing interactions with a classical crawler module 156, classical page repository 158, classical indexes and modules 160, and classical query and ranking modules 162 within a world wide web (WWW) framework 164.

Referring further to FIG. 2, CQuery 146 requests may invoke the quantum search environment 154 by passing requests from classical query and ranking modules 162 across the quantum-classical application programming interface (QCAPI) 166 to a QS query module 108 along communication path 172. Positive quantum search results initiated by CQuery 146 requests are preferentially returned to a plurality of users 102 in the form of a QSRL 114 readable by users 102 operating within classical computing and networked environments.

Referring further to FIG. 2, the quantum search environment 154 is preferentially intrinsic to and interacts with the WWW framework 164, deep web, and non-web quantum computing and quantum networking environments 168, 170. The classical search environment 148 is preferentially intrinsic to and interacts with WWW classical computing and networking environments 164.

Integrated Cryptosystem

Referring further to FIG. 2 and as summarized above, the quantum search indexes system environment 112 preferentially incorporates an encryption index 136, generated by quantum encryption, classical encryption, and steganographic encryption components 138, 140, 142, where the integrated cryptosystem performs a plurality of operations including, for example: (1) Encryption of search requests; and (2) Identification and tagging of search results that contain encrypted components, fields, and content.

Classical Cryptosystem

Referring still to FIG. 2, the classical encryption component 140 of the encryption index 136 preferentially incorporates standards-based interfaces and is compatible with existing classical (non-quantum) encryption and decryption standards and cryptosystems, including for example: Advanced Encryption Standard (AES), Federal Information Processing Standards Publication 197 (FIPS PUB 197), a symmetric block cipher substitution-permutation network capable of using cryptographic keys to encrypt and decrypt data in blocks of 128 bits using 10, 12, or 14 rounds depending upon key size; Triple Data Encryption Standard (Triple DES, TDES, 3DES), a block cipher formed by using DES three times, employing one, two or three keys; Rivest, Shamir, and Adleman (RSA), an algorithm for public-key cryptography; and Secure Hash Algorithm (SHA), a set of cryptographic hash functions.

Classical (non-quantum) public key cryptosystems and associated algorithms and keys generally derive their provably secure characteristics as a function of the difficulty in factoring large numbers that are the products of two large primes, where a prime number is an integer greater than one if its only divisors are one and itself. The initial five prime numbers are 2, 3, 5, 7, 11, for example.

Breaking large prime algorithms within classical (non-quantum) cryptosystems does not require a brute-force attack on every possible key value. Successful unauthorized penetration does generally however, rely upon brute-force attempts to factor a large number, or of taking discrete logarithms in a very large finite field. Throughout the 1970s, 1980s and 1990s, general understanding and experience dictated that if the number to factor were too small, system security was minimal, while sufficiently large numbers to factor were considered sufficient to ensure effectively impenetrable security. During 1977 for example, Ron Rivest stated that factoring a 125-digit number would require 40 quadrillion ($40 \times 10^{15}$) years given then-current compute power.

During 1994 however, a 129-digit number was successfully factored into primes. Bruce Schneier, writing in *Applied Cryptography* during 1996, projected the number of million-instruction-per-second (MIPS) years (that is, number of years needed for a 1-MIPS computer) required to factor numbers of varying sizes given then-current implementations of the general number sieve and special number sieve. The number field sieve is perhaps the best-known factoring algorithm, requiring a number of steps on the order of $O(e^{1.9(\log N)1/3(\log \log(N))}$ 2/3) to factor a number N, creating an exponential increase in the effort to find prime factors given a linear increase in key length. Schneier's 1996 summarized projections are summarized in Table 1 below:

TABLE 1

| Key Bits | MIPS Years Projected to Factor Using General Number Field Sieve | MIPS Years Projected to Factor Using Special Number Field Sieve |
|---|---|---|
| 512 | 30,000 | <200 |
| 768 | $2 \times 10^8$ | $10^6$ |
| 1024 | $3 \times 10^{11}$ | $3 \times 10^7$ |
| 1280 | $10^{14}$ | $3 \times 10^9$ |
| 1536 | $3 \times 10^{16}$ | $2 \times 10^{11}$ |
| 2048 | $3 \times 10^{20}$ | $4 \times 10^{14}$ |

Continuing in *Applied Cryptography* during 1996, Schneier projected the years by which increasingly lengthy key bits could be successfully factored, summarized in Table 2 below:

TABLE 2

| Year | Key Length (Bits) |
|---|---|
| 1995 | 1024 |
| 2005 | 2048 |
| 2015 | 4096 |
| 2025 | 8192 |
| 2035 | 16,384 |
| 2045 | 32,768 |

The Great Internet Mersenne Prime Search (GIMPS) was formed in January 1996 to discover increasingly large, world-record-size Mersenne primes. Mersenne Primes are primes of the form $2^P-1$, and are proven to be prime based on the factorizations of either N+1 or N−1, where the factorization of N+1 is as trivial as possible—a power of two. A Mersenne prime is a positive integer that is one less than a power of two, that is, $M^n=2^n-1$. The initial four Mersenne Primes are 3, 7, 31, and 127, for example.

The $41^{st}$ known Mersenne Prime ($2^{24,036,583}-1$, a 7,235,733-digit prime) was calculated on May 15, 2004, a calculation performed on a 2.4 GHz Pentium 4 computer. A 53-digit factor for M971, the smallest Mersenne number for which no factors were known, was calculated on Sep. 13, 2004.

The $42^{nd}$ known Mersenne Prime ($2^{25,964,951}-1$, a 7,816,230-digit prime) was calculated Feb. 26, 2005, a calculation requiring approximately 50 days on a 2.4 GHz Pentium 4 processor.

The $43^{rd}$ known Mersenne Prime ($2^{30,402,457}-1$, a 9,152,052-digit prime, known as M30402457), was calculated on Dec. 15, 2005, a calculation requiring over 700 coordinated PCs comprising a portion of PrimeNet, 70,000 networked computers. PrimeNet collectively organizes parallel number crunching to create a virtual supercomputer running 24×7 at 18 teraflops ($18\times10^{12}$ vector floating point operations per second). M30402457 was initially independently verified in five days using 16 Itanium2 1.5 GHz CPUs, and subsequently independently verified over a 14-day period on 14 CPUs of a Compaq Alpha GS160 1.2 GHz CPU server.

The $44^{th}$ known Mersenne Prime ($2^{32,582,657}-1$, a 9,808,358-digit prime) was calculated on Sep. 4, 2006 using idle time on 700 PrimeNet lab PCs. The $44^{th}$ known Mersenne Prime had been previously projected to require 4,000 years to calculate using a single PC. The last few Mersenne Primes have been calulated using a special form of Fast Fourier Transform (FFT) called DWT. The $45^{th}$ known Mersenne Prime ($2^{37,156,667}-1$, an 11,185,272-digit prime) was calculated on Sep. 6, 2008, The $46^{th}$ known Mersenne Prime ($2^{43,112,609}-1$, a 12,978,189-digit prime) was calculated on Aug. 23, 2008.

Significantly larger primes continue to be calculated on increasingly portable and generally-available computers, suggesting calculations of multi-magnitude digit enlargement of prime numbers, performed on increasingly ubiquitous computing platforms, within rapidly diminishing—and therefore increasingly tractable—time intervals. Compute-intensive evolution of processing platforms and their increasingly widespread availability, further demonstrate trends to accelerating improvements in capabilities to compromise encryption keys within classical (non-quantum) private cryptosystems, as well as to successfully factor increasingly large primes from ever-larger integers within the keys of classical (non-quantum) public cryptosystems using classical (non-quantum) computing systems.

Anticipated continuing evolution of quantum computing will likely usher in an era where even brute-force hacking of primes, their factors, and all possible encryption keys (private or public), will be increasingly achievable within rapidly diminishing, non-exponential—and therefore, tractable—time intervals, due primarily to the intrinsic capability of quantum computingtechnologies and methodologies to pursue a plurality of computational trajectories simultaneously.

Quantum Cryptosystem

Referring further to FIG. 2, the quantum encryption component 138 of the encryption index 136 preferentially addresses major disadvantages associated with classical (non-quantum) private key cryptosystems, including for example: (1) Secure distribution of key bits—the Vernam cipher, for example—remains secure only as long as the number of key bits is at least as large as the size of the message being encoded; (2) Key bits cannot be reused, quickly rendering such schemes impractical; (3) Key bits must be delivered in advance of use; (4) Key bits, once delivered, must be protected with great care; (5) Key bits must be destroyed after one-time use; and (6) Classical (non-quantum) information can be readily copied without disturbing the originals, therein compromising the security of the overall protocol and system environment. Nevertheless, private key cryptosystems remain in widespread use due to reasonable probabilities of generating and maintaining provable security, coupled with delivery of key materials by classical (non-quantum) private, secured communication links, and/or through trusted couriers.

The quantum encryption component 138 of FIG. 2 preferentially employs a method wherein qubits are established via an oscillating polarization function generated as a function of the time-varying electric field of a light wave, where the relationship between the polarization and applied electric field is linear, with the resulting time-varying polarization sinusoidal at frequency $\omega_1$ through $\omega_n$. In this way, sinusoidally-varying fields are generated for any medium in which induced polarization is a nonlinear function of any electric field, inducing polarizations that incorporate frequency components at 1-to-n higher harmonics of the original (first-order, or linear) frequency, generating the basis for 1-to-n qubit encryption, where $\Sigma$-frequencies of second-to-nth-order harmonic waves expressing as qubits are calculated using perturbations of Maxwell's equations for static and time-varying electric and magnetic fields, and where computational reversibility may be calculated through an Inverse Fourier Transform on any classical (non-quantum) function $f(x)$.

The quantum encryption component 138 of FIG. 2 further preferentially enables computational reversibility that can be calculated through a Quantum Fourier Transform (QFT) as the discrete Fourier transform with a specified decomposition into a product of simpler unitary matrices.

The quantum encryption component 138 of FIG. 2 further preferentially enables a method wherein the relationship between induced polarization P and the electric field E is not linear; qubits are established as a result of the generated polarization not being the same for a given applied field of magnitude $+E_0$, in the same fashion as for an applied field of magnitude $-E_0$. In either case, the polarization response to any given applied sinusoidal field is not purely sinusoidal, generating a distortion reflecting the presence of polarization components at frequencies $\neq \omega_1$, and therefore providing the basis state for a strong component at the second-harmonic frequency $2\omega_1$, and at nth-harmonic frequencies $2\omega_n$.

The quantum encryption component 138 of FIG. 2 further preferentially enables sending-receiving parties to rotate Einstein-Podolsky-Rosen (EPR) quantum-key-generating pairs $[(|00\rangle+|11\rangle)/\sqrt{2})]$ by 1-to-n spin-polarized phase angles ($\theta$) throughout the integer and/or sub-integer range $0 \leq \theta \leq 360$.

Steganographic Cryptosystem

Referring further to FIG. 2, the steganographic component 142 of the encryption index 136 preferentially enables quantum cryptographic algorithms, keys, and references thereto, to be steganographically encoded and referenced, within classical (non-quantum) fields protected by n-bit keys, and references thereto.

Referring further to FIG. 2, the steganographic component 142 of the encryption index 136 preferentially incorporates a method for stegonographically embedding 1-to-n quantum cryptographic algorithms, keys, and references thereto, within 1-to-n classical (non-quantum) fields, and references thereto, comprising the following steps: (1) Initializing the sequence by encoded reference to quantum computational results from a plurality of methods resulting in generation of non-orthogonal qubits; (2) Generating a non-orthogonal qubit result reference field comprising 1-to-n classical bits; (3) Generating a pseudo-random key sequence using a classical (non-quantum) exclusive OR (XOR) operation; (4) Encrypting the XOR pseudo-random result employing a commutative one-way accumulator; (5) Pseudo-randomly interspersing check bits among (classical) data bits; (6) Embedding reference (classical) check bits to calculated non-orthogonal qubits and references thereto; and (7) Embedding the (classical) data referenced by classical check bits into variable-length message data and overhead fields.

The steganographic component 142 of the encryption index 136 preferentially incorporates a reversible computational method for retrieving 1-to-n embedded quantum cryptographic algorithms, keys, and references thereto, from 1-to-n classically encrypted fields, and references thereto. The steganographic component 142 of the encryption index 136 preferentially incorporates a method wherein classical (non-quantum) data fields protected by n-bit keys, and references thereto, are steganographically encoded and referenced within quantum cryptographic algorithms, keys, and references thereto.

The steganographic component 142 of the encryption index 136 preferentially incorporates a method for steganographically embedding 1-to-n classical (non-quantum) cryptographic algorithms, keys, and references thereto, within 1-to-n quantum cryptographic algorithms and keys, and references thereto, comprising the following steps: (1) Initializing the sequence by encoded reference to classical (non-quantum) encryption algorithms and keys; (2) Generating a random quantum key sequence resulting in non-orthogonal qubits; (3) Calculating a spin-polarized phase angle pointer to 1-to-n classical (non-quantum) cryptographic algorithms and keys; (4) Calculating the associated inner product $\langle\phi|\Psi\rangle$ between the vectors $|\phi\rangle$ and $|\Psi\rangle$; (5) Calculating the associated tensor product $|\phi\rangle \otimes |\Psi\rangle$ of $|\phi\rangle$ and $|\Psi\rangle$; (6) Embedding reference quantum check qubits to calculated classical (non-quantum) cryptographic algorithms, keys, and references thereto; and (7) Embedding the quantum computational result into the transmitted quantum message.

Referring further to FIG. 2, the steganographic component 142 of the encryption index 136 preferentially incorporates a reversible computational method for retrieving 1-to-n embedded classical (non-quantum) cryptographic algorithms, keys, and references thereto, from 1-to-n quantum encrypted fields, and references thereto.

Quantum Search, Memory, and Retrieval

Figure 3A:
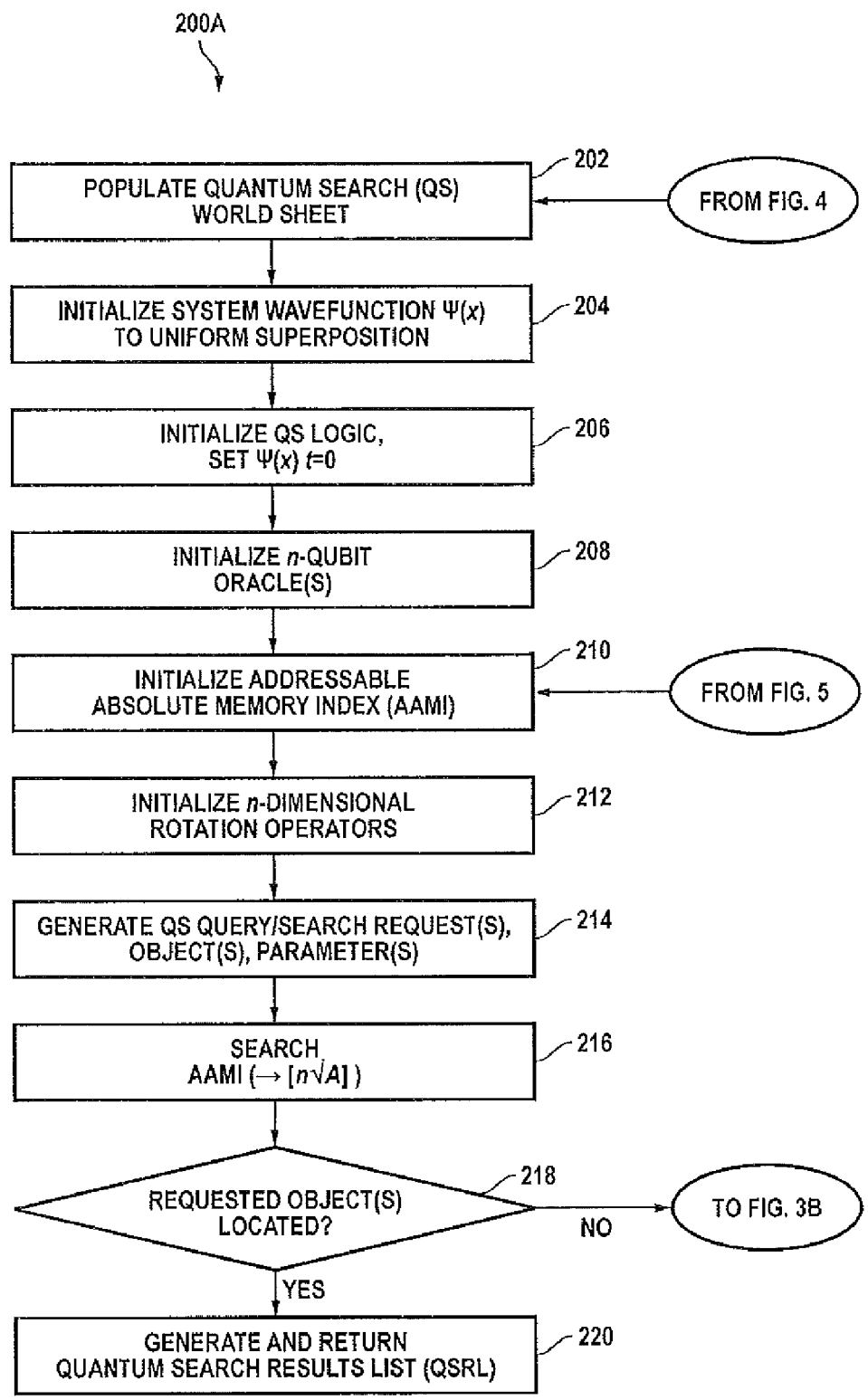
FIG. 3A is a process flow diagram depicting an n-dimensional quantum search, quantum computation, and quantum memory system process in accordance with the subject technology.
Figure 3B:
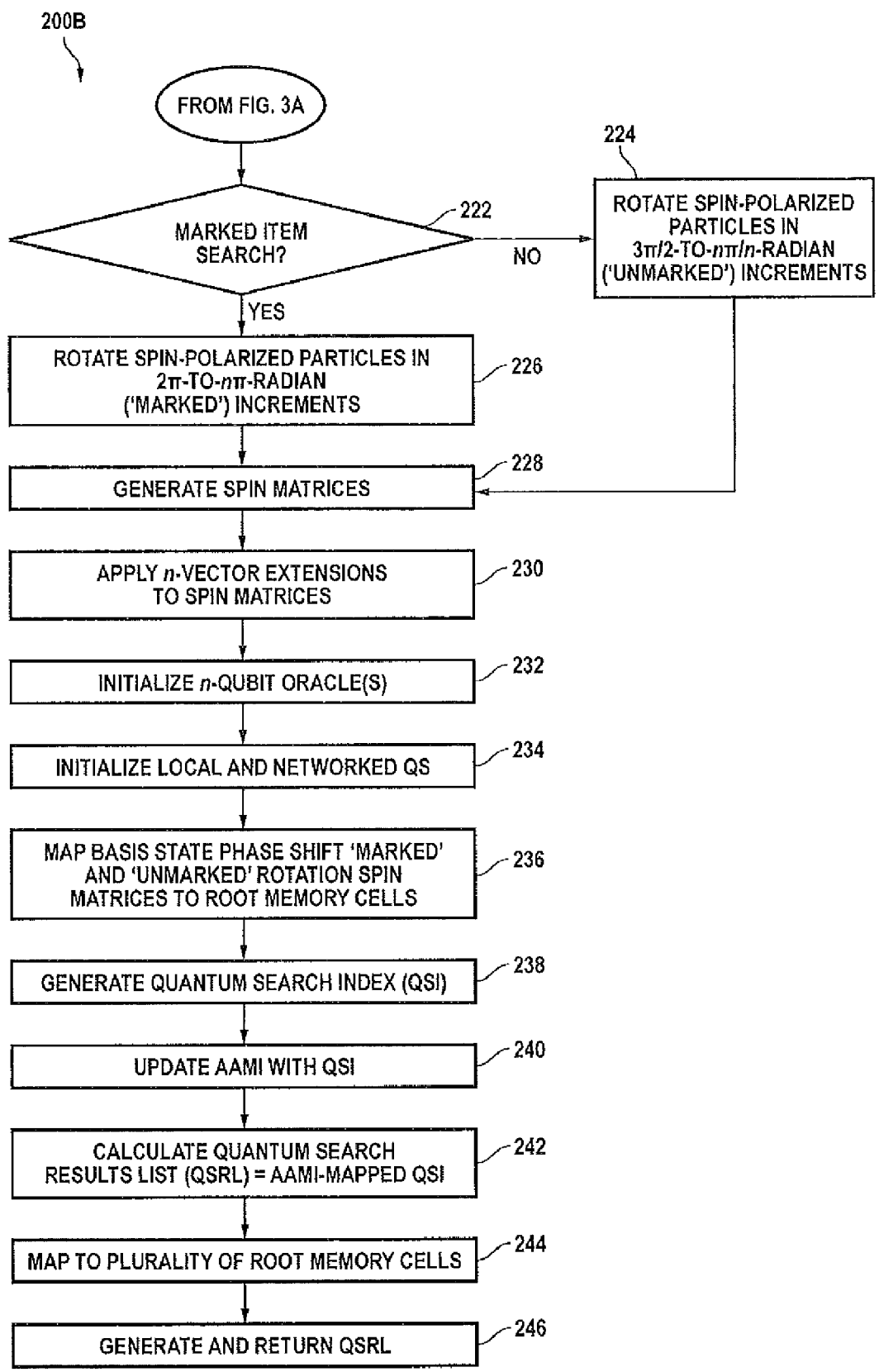
FIG. 3B, a continuation of FIG. 3A, is a process flow diagram depicting an n-dimensional quantum search, quantum computation, and quantum memory system process in accordance with the subject technology.

Referring to FIGS. 3A and 3B a somewhat schematic flow diagram 200A-B of the method of quantum search, quantum computation, quantum memory, and quantum retrieval employed by the system 100 is shown. FIG. 3A incorporates inputs from FIG. 4, FIG. 5, and FIG. 3B as denoted on the figures. Similarly, FIG. 3B incorporates input from FIG. 3A as denoted on the figure.

Figure 4:
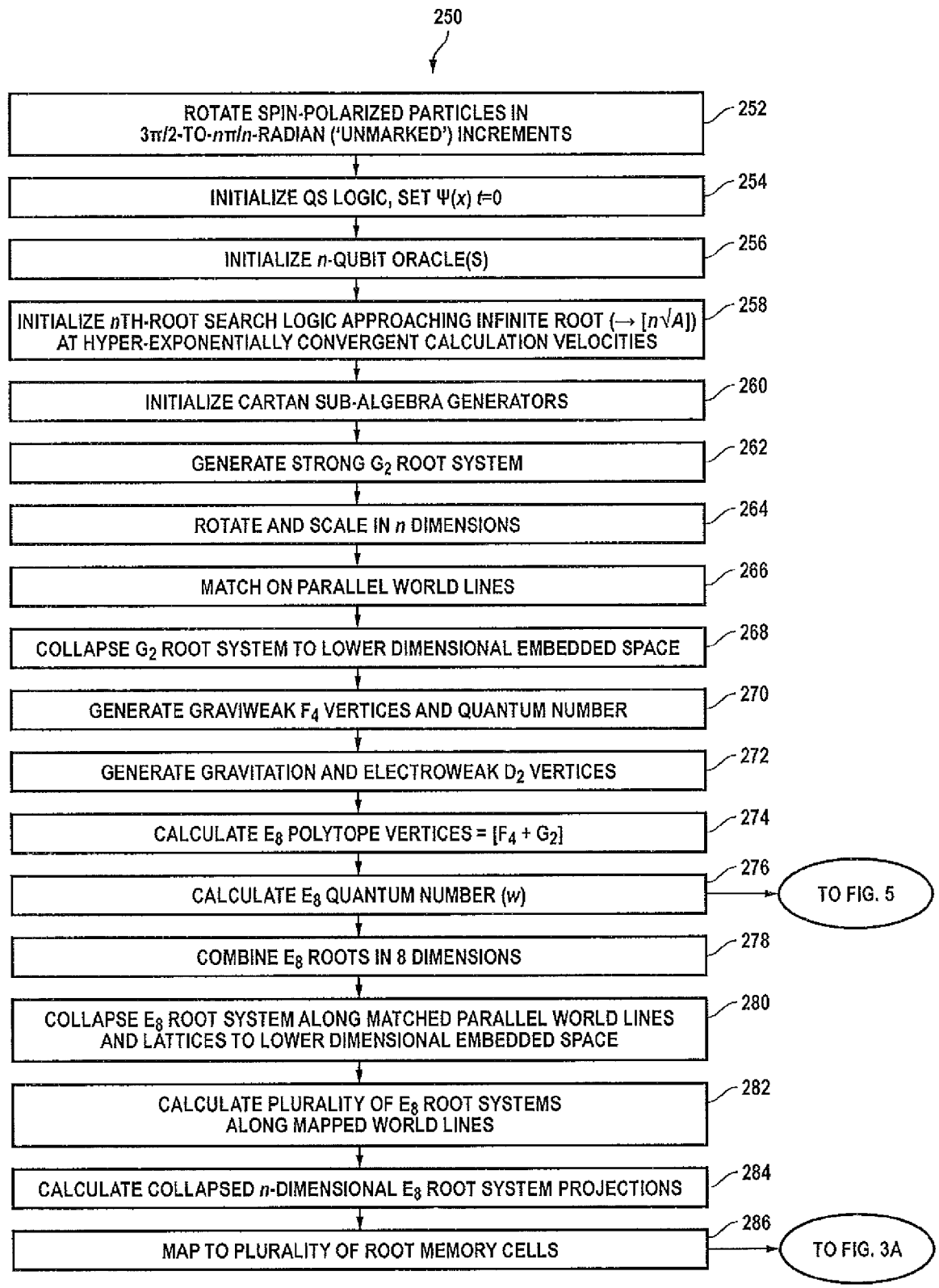
FIG. 4 is a process flow diagram depicting a quantum search world sheet generation and population process, and provides input into FIG. 3A in accordance with the subject technology.

Referring to FIG. 3A and to FIG. 4, a quantum search world sheet is preferentially populated based on an n-dimensional search initialized by inputs or steps as illustrated in FIG. 4, where the quantum search world sheet is the product of a quantum global-scale search throughout WWW (FIG. 2, 164), deep web (FIG. 2, 168), and non-web (FIG. 2, 170) indexed and non-indexed content and object environments, utilizing a plurality of exceptional root systems (i.e., $G_2$, $F_4$, $E_6$, $E_7$, $E_8$) consisting of all vectors (roots) located, resolved, and mapped at hyper-exponentially convergent calculation velocities, and generates a global search image map. FIG. 4 includes a list 250 of inputs or steps as follows: step 252 rotates spin-polarized particles (photons/bosons, electrons/fermions) in $3\pi/2$-to-$n\pi/n$-radian ('unmarked') increments; step 254 initializes quantum search logic; step 256 initializes n-qubit oracles; step 258 initializes nth-root search logic approaching infinite root ($\rightarrow[\sqrt[n]{A}]$) at hyper-exponentially convergent calculation velocities; step 260 initializes Cartan sub-algebra generators; step 262 generates a Strong $G_2$ root system [12-root SU(3)]; step 264 rotates and scales in n dimensions; step 266 matches on parallel world lines; step 268 collapses the $G_2$ root system to a lower-dimensional embedded space; step 270 generates Graviweak $F_4$ vertices and associated quantum number; step 272 generates Gravitation and Electroweak $D_2$ vertices and associated quantum number; step 274 calculates $E_8$ polytope vertices=$[F_4+G_2]$; and step 276 calculates an $E_8$ quantum number (w) to FIG. 5.

Further referring to FIG. 4, step 278 combines a plurality of $E_8$ roots in 8 dimensions. At step 280, an $E_8$ root system is collapsed along matched parallel world lines and lattices to lower-dimensional embedded space. At step 282, calculation of a plurality of $E_8$ root systems is performed along matched parallel world lines. At step 284, calculation of a plurality of collapsed n-dimensional $E_8$ root system projections is performed utilizing quantum gap logic (as in Claim 1 of Routt, U.S. Pat. No. 7,451,292, Methods For Transmitting Data Across Quantum Interfaces and Gates Using Same). At step 286, mapping to a plurality of root memory cells is performed (as in Claims 2, 4, 5, 29, 32 of Routt, U.S. Pat. No. 7,451,292, Methods For Transmitting Data Across Quantum Interfaces and Gates Using Same), to FIG. 3A.

Referring to FIG. 3A, at step 202, a quantum search world sheet database is preferentially populated (FIG. 3A from FIG. 4). System wavefunction [$\Psi(x)$] is preferentially initialized at step 204 to uniform superposition utilizing an nth-root algorithm approaching infinite root ($\rightarrow[\sqrt[n]{A}]$) at hyper-exponentially convergent calculation velocity with equal amplitudes in all basis states and where the sums of entries in initialization matrix columns are unity. Quantum computing and search functions and operations in the subject technology are preferentially initialized to the system superposition:

$$[(|0\rangle+|00\rangle+\ldots+|0\ldots0\rangle+|1\rangle+|11\rangle+\ldots+|1\ldots1\rangle)/\sqrt{n}2] \qquad \text{Equation 5}$$

where: (1) The superposition is generated within an nth root of A number of steps; (2) Infinite root is approached at hyper-exponentially convergent calculation velocities; (3) A is any complex number of the form a+bi; (4) a and b are real numbers; and (5) i is the imaginary unit, with the property $i^2=-1$.

At step 206, quantum search logic is initialized by setting $\Psi(x)t=0$. Quantum logic initialization for a named search sets the wavefunction time to zero, where $[(t=0) \Psi(x)]$ is an eigenstate of the Hamiltonian (H), a self-adjoint operator acting on the state space to initialize computational energy as a physically observable (real number-based) quantity=N which is associated with a named search set=$S_n$. At step 208, a plurality of n-qubit oracles is initialized.

Addressable Absolute Memory Index (AAMI)

Figure 5:
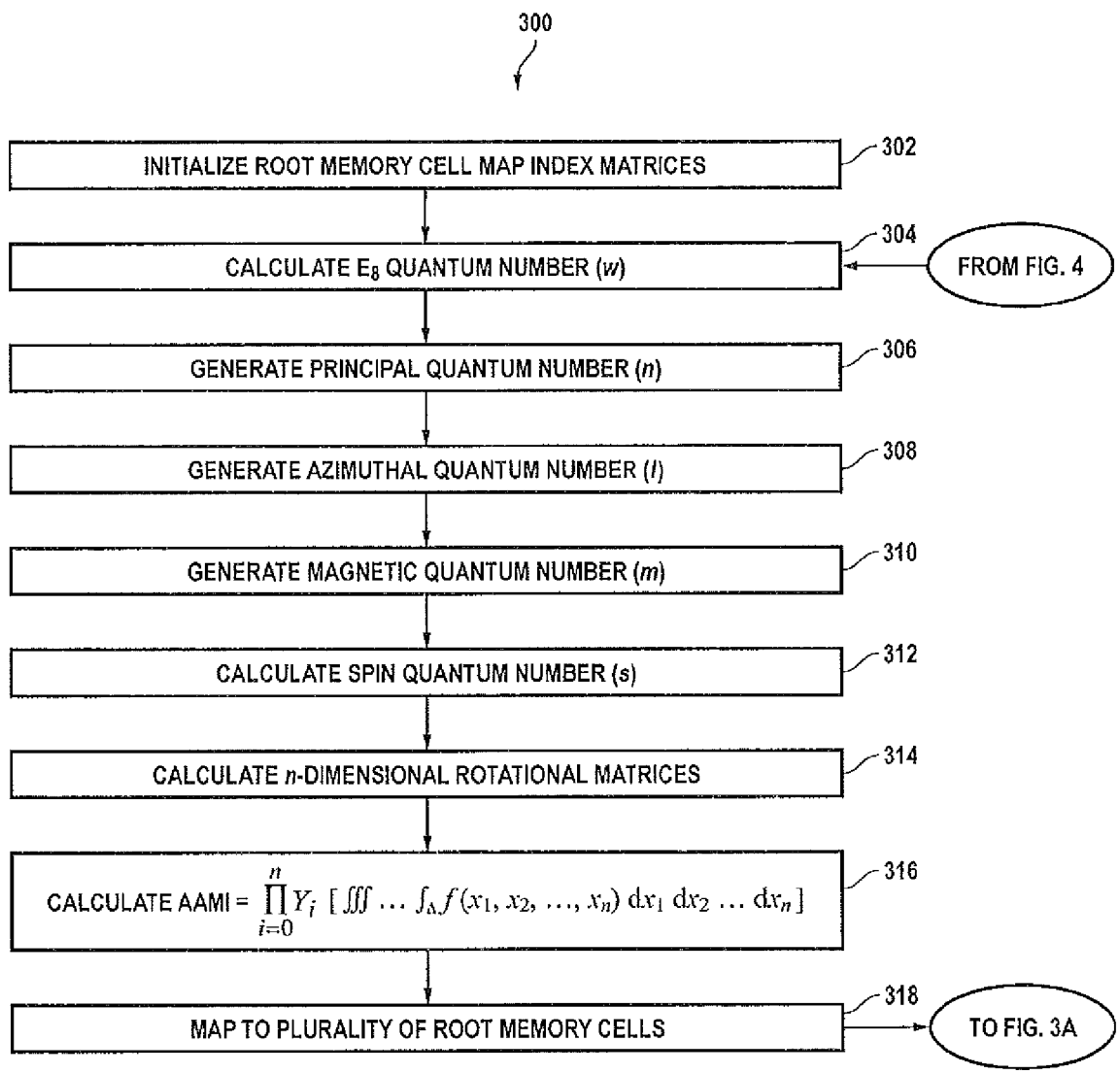
FIG. 5 is a process flow diagram depicting an addressable absolute memory index generation process, and provides input into FIG. 3A.

Referring further to FIG. 3A and to FIG. 5, at step 210, an addressable absolute memory index (AAMI) is preferentially generated from FIG. 5. FIG. 5 includes a list 300 of steps. Step 302 initializes a plurality of root memory cell map index matrices. Step 304 calculates $E_8$ quantum number (w) (from FIG. 4). Step 306 generates principal quantum number (n). Step 308 generates azimuthal quantum number (l). Step 310 generates magnetic quantum number (m). Step 312 calculates spin quantum number (s). Step 314 calculates n-dimensional rotational matrices.

Referring still to FIG. 5, at step 316, an AAMI calculation operation is preferentially performed where:

$$AAMI = \prod_{i=0}^{n} Y_i \left[ \int \int \int \ldots \int_D f(x_1, x_2, \ldots, x_n) dx_1 dx_2 \ldots dx_n \right];$$

$$\left[ \prod_{i=0}^{n} Y_i \right]$$

is the Cartesian product of the set of all (n+1)-tuples $(y_0, \ldots, y_n)$; $[\int\int\int \ldots \int]$ is an n-dimensional indefinite/unbounded integral; $[(x_{n-5}=c=\text{quantum memory cell})]$; $[(x_{x-4}=s=\text{spin quantum number})]$; $[(x_{n-3}=m=\text{magnetic quantum number})]$; $[(x_{n-2}=l=\text{azimuthal quantum number})]$; $[(x_{n-1}=n=\text{principal quantum number})]$; $[(x_n=w=E_8 \text{ quantum number})]$; and where AAMI comprises an n-level quantum system based upon a plurality of projective space vectors from the Bloch sphere (quantum electronic expression), or Poincaré sphere (quantum photonic expression), operating within n-dimensional Hilbert space.

Referring further to FIG. 5, at step 318, the calculated AAMI result is preferentially mapped to a plurality of memory cells, where 1-to-n addressable absolute memory indices can reside at a plurality of local and networked quantum and hybrid quantum-classical processing locations, platforms, and environments; and a plurality of mapped memory cells is input to FIG 3A.

Referring further to FIG. 3A and to FIG. 5, following AAMI initialization in FIG. 5, n-dimensional rotation operators are preferentially initialized by quaternions at step 212 of FIG. 3A. The subject technology preferentially comprises the use of a plurality of quaternions to enable multi-dimensional computation, search, storage, and retrieval, where quaternions are utilized as a non-commutative extension of complex numbers and form a 4-dimensional normed division algebra over the real numbers, where the set H of a plurality of quaternions is a vector space over the real numbers on the unit 4-dimensional hypersphere, and where the hypersphere is any n-dimensional sphere for $n \in 3$. The subject technology further preferentially comprises quaternion representations of quantum search, storage, and retrieval results by use of a plurality of 2×2 complex matrices.

The subject technology further preferentially comprises quaternion representations of quantum search, storage, and retrieval results by use of a plurality of 4×4 real matrices, where, for example, the quaternion [a+bi+cj+dk] can be represented as:

$$[a+bi+cj+dk] = \begin{pmatrix} a & b & c & d \\ -b & a & -d & c \\ -c & d & a & -b \\ -d & -c & b & a \end{pmatrix} = \quad \text{Equation 6}$$

$$a\begin{pmatrix} 1 & 0 & 0 & 0 \\ 0 & 1 & 0 & 0 \\ 0 & 0 & 1 & 0 \\ 0 & 0 & 0 & 1 \end{pmatrix} + b\begin{pmatrix} 0 & 1 & 0 & 0 \\ -1 & 0 & 0 & 0 \\ 0 & 0 & 0 & -1 \\ 0 & 0 & 1 & 0 \end{pmatrix} +$$

$$c\begin{pmatrix} 0 & 0 & 1 & 0 \\ 0 & 0 & 0 & 1 \\ -1 & 0 & 0 & 0 \\ 0 & -1 & 0 & 0 \end{pmatrix} + d\begin{pmatrix} 0 & 0 & 0 & 1 \\ 0 & 0 & -1 & 0 \\ 0 & 1 & 0 & 0 \\ -1 & 0 & 0 & 0 \end{pmatrix}$$

The subject technology further preferentially comprises a plurality of 3-to-n-dimensional quaternion-based rotation operators and operations, where computational results can be converted back as needed to a plurality of orthogonal matrices, and where for example, the orthogonal matrix corresponding to a rotation by the unit quaternion [z=a+bi+cj+dk] (with |z|=1) is given by:

$$[z = a + bi + cj + dk] = \quad \text{Equation 7}$$

$$\begin{pmatrix} a^2 + b^2 - c^2 - d^2 & 2bc - 2ad & 2ac + 2bd \\ 2ad + 2bc & a^2 - b^2 + c^2 - d^2 & 2cd - 2ab \\ 2bd - 2ac & 2ab + 2cd & a^2 - b^2 - c^2 + d^2 \end{pmatrix}$$

The subject technology further preferentially comprises a plurality of mapping indices among a plurality of real-, complex-, and quaternion-based computations and representations, where spin polarizations of component beam electrons and photons are preferentially associated with computational mapped index results.

The subject technology further preferentially incorporates a canonical form for the commutation relations of a Lie algebra, where resulting equations are invariant under the nonsingular transformation U, and where the canonical form is a polynomial in λ of order η, with real coefficients $\phi_j(r^j)$, depending on the choice of Lie algebra element.

Referring further to FIG. 3A, at step 214, a plurality of quantum search requests and parameters is preferentially generated and presented across a quantum application programming interface (see QAPI 106 of FIG. 2).

At step 216, the receive process searches the AAMI engine preferentially utilizing nth-root search logic approaching infinite root ($\rightarrow [n\sqrt{A}]$) at hyper-exponentially convergent calculation velocities, and compares, at step 218 to determine if the requested objects are located, a plurality of search request and parameters to a plurality of items mapped to a plurality of memory cells to determine whether or not the presented quantum search request(s) and parameter(s) invoke 1-to-n marked item(s).

Referring further to FIG. 3A, at step 220, if 1-to-n items in the AAMI search engine 124 match the presented named object search request (Yes) a quantum search results list (QSRL) is generated and returned across QAPI (refer to FIG. 2, QAPI 106). If 1-to-n items in the AAMI search engine 124 do not match the presented named object search request (No) the search query/request is presented to FIG. 3B.

Referring to FIG. 3B, at decision step 222, a marked item search compare is preferentially performed. If the search request is determined to be a request for a plurality of marked items (Yes), the flowchart 200B passes control to step 226, where the request receiving process rotates spin-polarized particles (photons/bosons, electrons/fermions) in $2\pi$-n$\pi$-radian ('marked') increments.

If the search request is determined to be a request for a plurality of unmarked items (No) at step 222, the flowchart 200B passed control to step 224, where the request receiving process preferentially rotates spin-polarized particles (photons/bosons, electrons/fermions) in $3\pi/2$-n$\pi/2$-radian ('unmarked') increments. Marked rotations ($2\pi$-to-n$\pi$-radians) and unmarked rotations ($3\pi/2$-to-n$\pi/n$-radians) are associated with a plurality of quantum search indices utilizing an nth root algorithm, where a plurality of radicands is enabled, approaching infinite root at exponentially or hyper-exponentially convergent calculation velocities.

In either case, the flowchart 200B of FIG. 3B passes control to step 228, where spin-polarized particle results from 'marked' and 'unmarked' rotations preferentially generate a plurality of spin matrices. At step 230, n-vector extensions are applied to a plurality of spin matrices. At step 232, a plurality of n-qubit oracles are initialized. At step 234, local and networked quantum search logic is initialized. At step 236, 'marked' and 'unmarked' rotation spin matrices are mapped to root memory cells. At step 238, a quantum search index (QSI) is generated (refer also to FIG. 2, quantum search index 118). At step 240, AAMI is updated with QSI.

QSI in the subject technology is preferentially generated utilizing an nth root algorithm, where a plurality of radicands is enabled, approaching infinite root ($\rightarrow[n\sqrt{A}]$) at hyper-exponentially convergent calculation velocities, where the radicand is any complex number of the form a+bi, where a and b are real numbers, where i is the imaginary unit, with the property $i^2=-1$, and where the radical and root are encoded by the infinite series:

$$(1+x)^{s/t} = \sum_{n=0}^{\infty} \frac{\prod_{k=0}^{n}(s+t-kt)}{(s+t)n!t^n} x^n \qquad \text{Equation 8}$$

with $|x| < 1$.

Referring further to FIG. 3B, at step 242, a quantum search results list (QSRL) is calculated as AAMI-mapped QSI (refer also to FIG. 2, QSRL 114) and, at step 244, mapped to a plurality of root memory cells (refer also to FIG. 2, root memory cells 134). At step 246, the generated QSRL is returned (refer also to FIG. 2, QSRL 114, QAPI 106, and users 102). Subsequent named search sets $[S_{n+1} \rightarrow S_\infty]$ are preferentially initialized on $E_8$ roots and cells that are directly mapped to a plurality of root memory cells.

Root Systems and Lie Algebras

Photonic and electronic spin polarizations in the subject technology are preferentially associated with and encoded to, a plurality of Lie groups, where a Lie group is a differentiable manifold with the property that group operations are compatible with a continuous-symmetry smooth structure, i.e., continuous symmetries of differential equations. The quantum search, computation, memory and storage system of the subject technology further preferentially comprises a means to associate a plurality of spin states with local or linearized versions of a global quantum computational object with its infinitesimal group, based on Lie algebra.

The quantum search system based on the subject technology preferentially comprises a plurality of root systems associated with a plurality of N-dimensional Lie algebras, each considered as a vector space, containing an R-dimensional subspace—a Cartan algebra—spanned by a maximal set of R-interconnecting generators, $T_a$, where R is the rank of a given Lie algebra, and where each of the (N-R) non-zero eigenvalues, $\alpha_\beta$(imaginary for real compact groups), is linearly dependent on the coefficients of C (Cartan subalgebra), and corresponds to a point—a root, $\alpha_{a\beta}$—in the space dual to the Cartan subalgebra.

The subject technology further preferentially comprises a plurality of root vectors and a plurality of Cartan subalgebra generators that span the Lie algebra and, in so doing, can function as generators—the Cartan-Weyl basis of the Lie algebra—where the Lie bracket between root vectors corresponds to vector addition between their roots, and to interactions among a plurality of quantum memory address locations.

The subject technology preferentially comprises a quantum search, computation, memory and storage address mapping scheme based on a plurality of exceptional root systems, including the $E_8$ root system. The $E_8$ root system, initially described as a polytope by Thorold Gosset in 1900, is the largest simple exceptional Lie group, and consists of 240 vectors of complex dimension 248 Lie algebra, where roots are nonzero vectors in a Euclidean space on which exists a positive definite metric. $E_8$ vectors are the vertices (corners) of the Gosset polytope $4_{21}$, and 8-dimensional object.

$E_8$ is a complex Lie algebra where the coordinates are complex numbers. The $E_8$ root system can be rotated in eight dimensions, and contains the $F_4$ and $G_2$ root systems which are orthogonal in $E_8$, and where rotations between the two have been shown, for example, to identify interactions between elementary particles [A. Garrett Lisi, "An Exceptionally Simple Theory of Everything," arXiv:0711.0770v1, 6 Nov. 2007].

The $E_8$ designation derives from Wilhelm Killing and Elie Cartan's classification of the complex simple Lie algebras made between 1888 and 1890, comprising four infinite families labeled $A_n$, $B_n$, $C_n$, $D_n$, and five exceptional cases labeled $E_6$, $E_7$, $E_8$, $F_4$, and $G_2$. The $E_8$ algebra is the largest and most complex of these exceptional cases and relates to a family of closely related structures. $E_8$ is also the name of the corresponding root system, root lattice, and Weyl/Coxeter group, as welt as some finite, simple Chevalley groups.

The subject technology further preferentially comprises the $E_8$ root system as a configuration of vectors in a Euclidean space, where: (1) The only scalar multiples of a root $\alpha \in \phi$ that belong to $\phi$ are $\alpha$ itself and $-\alpha$; (2) For every root $a \in \phi$, the set $\Phi$ is closed under reflection through the hyperplane perpendicular to $\alpha$ (that is, for any two roots $\alpha$ and $\beta$, the set $\Phi$ contains the reflection of $\beta$):

$$\sigma_\alpha(\beta) = \beta - 2\frac{(\alpha, \beta)}{(\alpha, \alpha)}\alpha \in \Phi. \qquad \text{Equation 9}$$

and, (3) If α and β are roots in Φ, then the projection of β onto the line through α is a half-integral multiple of α, that is:

$$\langle \beta, \alpha \rangle = 2 \frac{(\alpha, \beta)}{(\alpha, \alpha)} \in \mathbb{Z}, \qquad \text{Equation 10}$$

the Integrality condition.

Figure 6A:
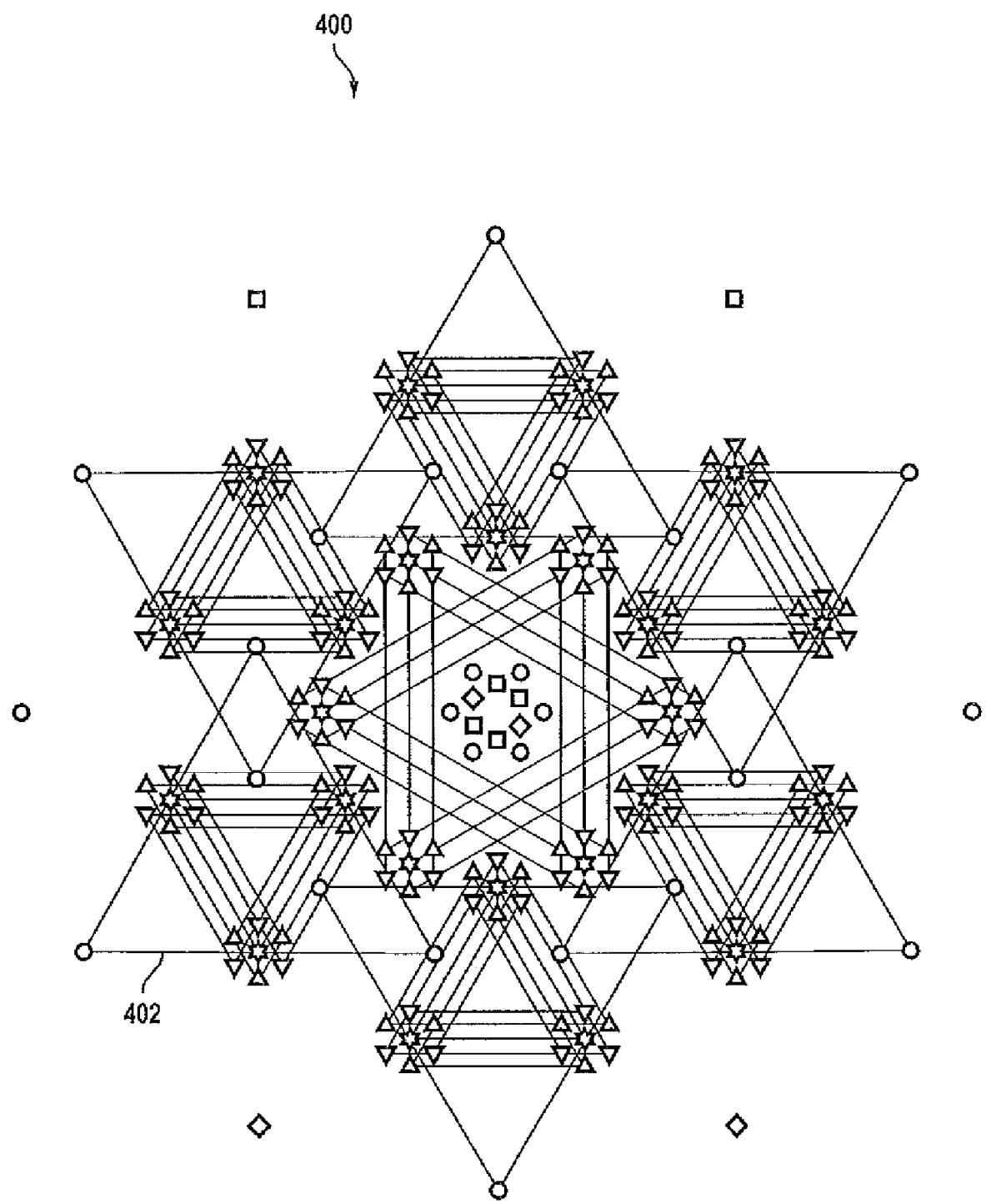
FIG. 6A is a somewhat schematic view of an $E_8$ root system in accordance with the subject technology.

FIG. 6A presents a somewhat schematic view 400 of the $E_8$ root system, rotated somewhat from $F_4$ (48 roots in four dimensions; vertices of the 24-cell polytope and its dual) toward $G_2$ (described in three dimensions as the 12 midpoints of the edges of a cube, the vertices of a cuboctahedron).

Figure 6B:
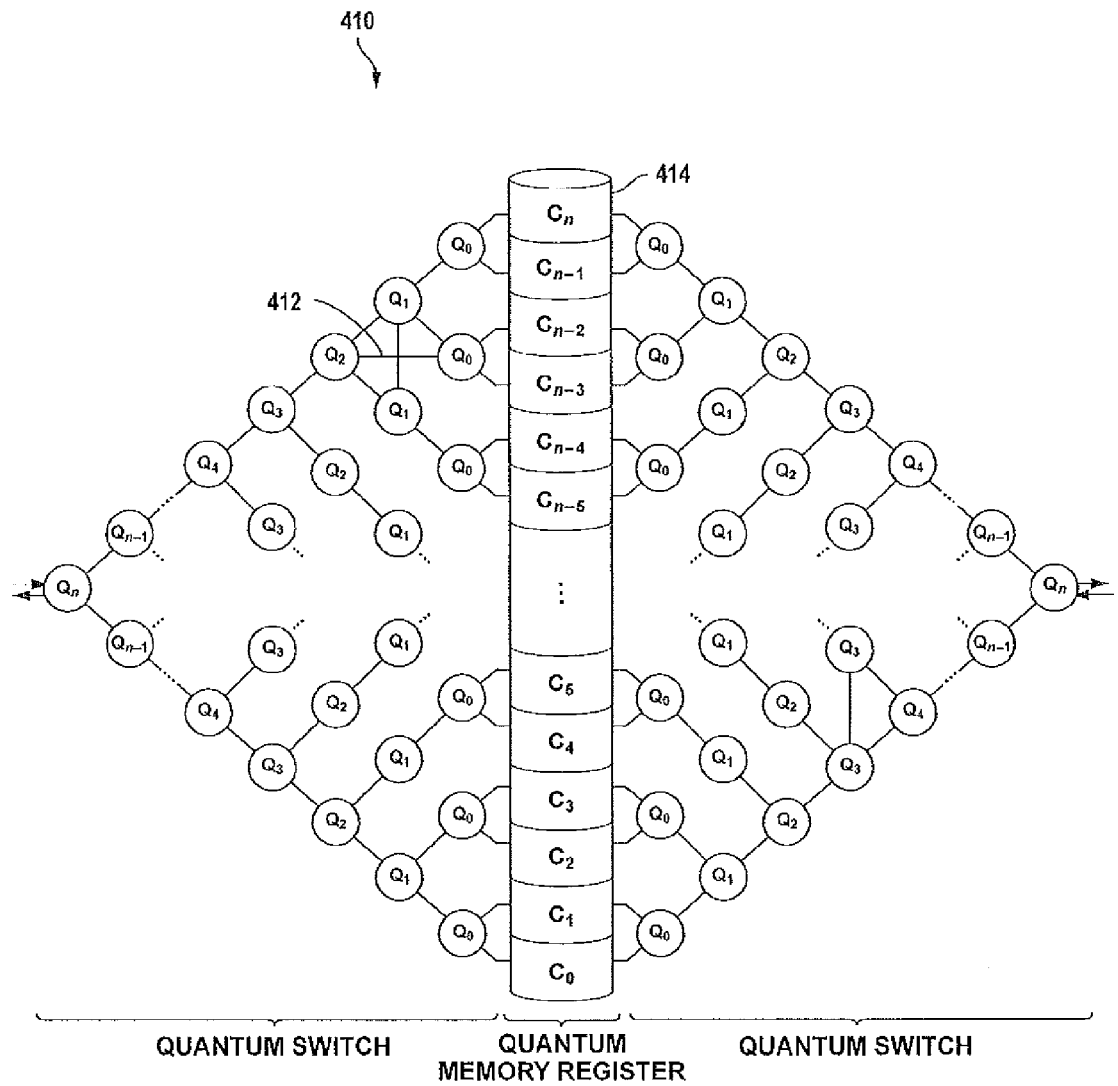
FIG. 6B is a somewhat schematic view of a quantum memory register and quantum switch system, and together with FIG. 6A depicts mapping of multi-dimensional, complex content to quantum memory in accordance with the subject technology.

FIG. 6B presents a somewhat schematic view 410 of a quantum memory environment (comprising a plurality of quantum/classical cells in a memory register, and a plurality of quantum switches that populate the memory register, as in claims 3, 4, 20, 21, 28 and 29 of Routt, U.S. Pat. No. 7,451,292, Methods For Transmitting Data Across Quantum Interfaces and Gates Using Same). FIG. 6B depicts methods 412 to map components of the FIG. 9A $E_8$ root system 402. FIG. 6B also depicts methods 414 to map the entire FIG. 6A root system 400 (FIG. 6B cell$_n$—C$_n$—location).

The subject technology further preferentially comprises a plurality of operations by elements of the Lie algebra and Cartan subalgebra on a plurality of vectors generated and located within a plurality of Lie group representation spaces, where the eigenvectors function as weight vectors of the Cartan subalgebra, with eigenvalues that correspond to the generalized roots (weights) that describe the representation.

The subject technology further preferentially comprises the use of a plurality of real numbers and complex numbers to enable multi-dimensional quantum search, computation, storage and retrieval.

Differential Equation Slope Fields

Figure 7A:
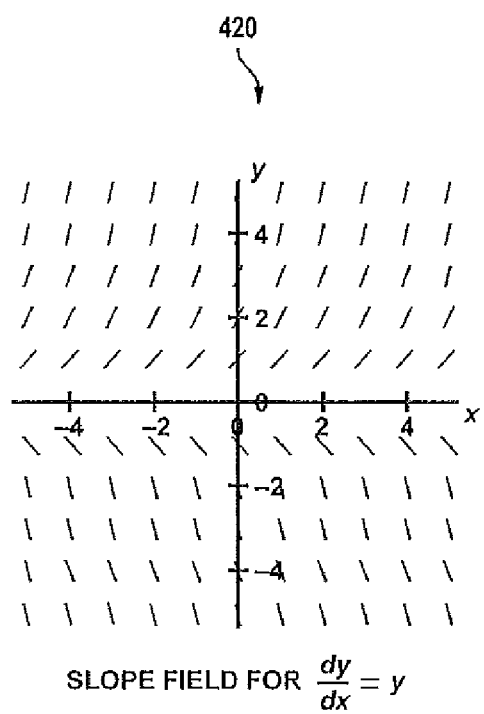
FIGS. 7A and 7B are somewhat schematic representations of autonomous and nonautonomous differential equation slope fields in accordance with the subject technology.
Figure 7B:
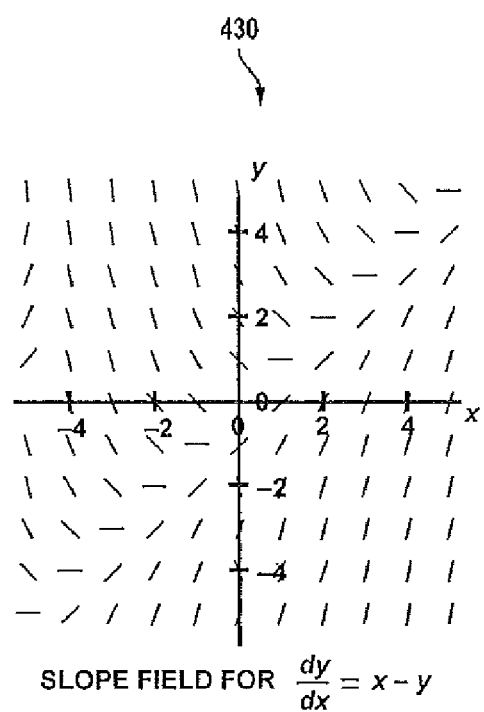

Referring to FIGS. 7A and 7B are somewhat schematic representations 420, 430 of autonomous and nonautonomous differential equation slope fields in accordance with the subject technology. Photonic and electronic spin polarizations in the subject technology are preferentially associated with, and encoded to, autonomous and non-autonomous differential equation slope fields, where convergence regions generate a plurality of addressable and reusable quantum search index identifiers (refer also to FIG. 2, quantum search index 118). The quantum search, memory, storage, and retrieval system based on the present technology, further preferentially incorporates a means to generate autonomous differential equations, yielding horizontal-shift-invariant slope fields, as represented shown in FIG. 7A.

Referring further to FIG. 7B the quantum search, memory, storage, and retrieval system based on the subject technology preferentially incorporates a means to generate nonautonomous differential equations, yielding horizontal- and vertical-shift-variant slope fields, and associates a plurality of nonautonomous differential equation-based slope fields to a plurality of spin-polarized photonic and electronic states.

The quantum memory and quantum data storage system based on the subject technology further preferentially incorporates a means to represent a plurality of spin-polarized photonic and electronic states, to a plurality of autonomous and nonautonomous differential equation-based slope fields.

Figure 8A:
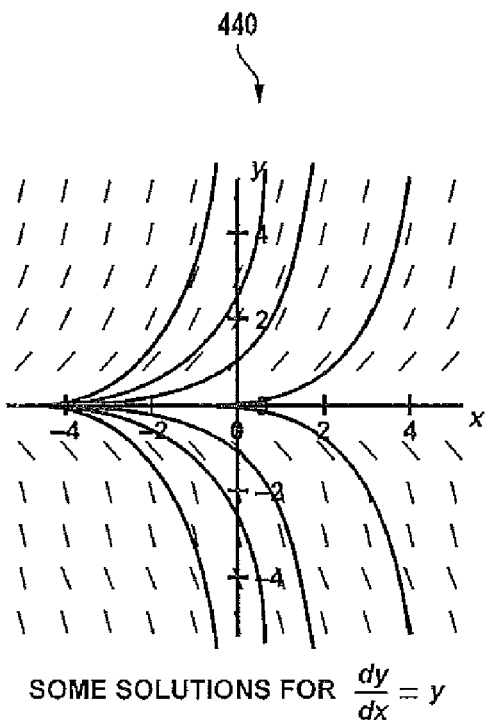
FIGS. 8A and 8B are somewhat schematic representations of autonomous and nonautonomous differential equation slope field solution curves in accordance with the subject technology.
Figure 8B:
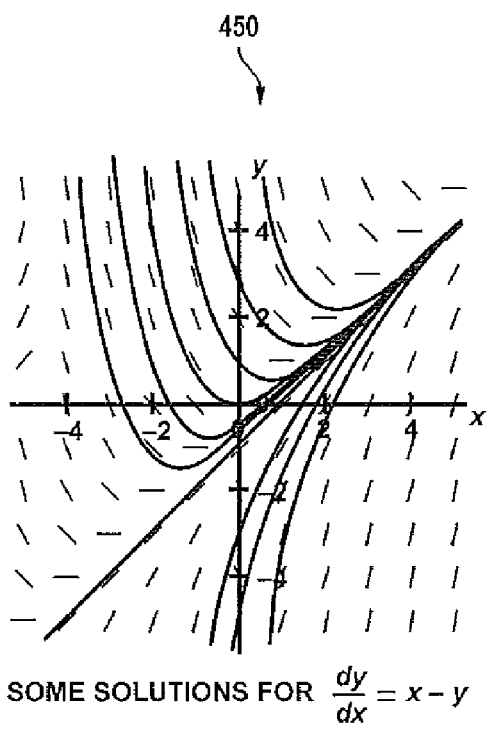

Referring to FIGS. 8A and 8B, somewhat schematic representations 440, 450 of autonomous and nonautonomous differential equation slope field solution curves are shown in accordance with the subject technology. The quantum memory and data storage system based on the subject technology preferentially incorporates a means to generate solution curves to autonomous and non-autonomous differential equation-based representations of spin-polarized photonic and electronic states, shown by example in representations 440 and 450, respectively, where convergence regions generate addressable and reusable quantum search index identifiers (refer also to FIG. 2, quantum search index 118).

Incorporation by Reference

All patents, published patent applications and other references disclosed herein are hereby expressly incorporated in their entireties by reference.

While the invention has been described with respect to preferred embodiments, those skilled in the art will readily appreciate that various changes and/or modifications can be made to the invention without departing from the spirit or scope of the invention as defined by the appended claims.

What is claimed is:

1. A system for quantum search and retrieval in multiple dimensions in a distributed computing environment having a plurality of users associated with clients comprising:
   a Quantum search query module configured for: receiving quantum search queries from clients across a Quantum application programming interface in the distributed computing environment; interfacing to classical query and ranking modules within a classical search system across a quantum-classical application programming interface in the distributed computing environment; and interfacing to a Quantum oracle index within an indexes system;
   the Quantum oracle index in the distributed computing environment;
   a Mapping index in the distributed computing environment including: a quantum search index with rotation operators and spin matrices components; an addressable absolute memory index with rotation matrices, quantum number, world sheet, root systems, and root memory cells components; and an encryption index with quantum, classical, and steganographic components;
   a Content mapping module in the distributed computing environment configured for: interfacing to the Mapping index within said indexes system; and generating a quantum search results list in response to the quantum search queries across the Quantum application programming interface; and
   the Quantum application programming interface in the distributed computing environment.

2. A system as recited in claim 1, incorporating a classical application programming interface and a quantum-classical application programming interface to a classical (non-quantum) search and retrieval system including: a classical crawler module; a classical page repository; a plurality of classical indexes and modules; and a plurality of classical query and ranking modules.

3. A system as recited in claim 1, wherein the system initializes to a superposition:

$$[(|0\rangle + |00\rangle + \ldots + |0\ldots 0\rangle + |1\rangle + |11\rangle + \ldots + |1\ldots 1\rangle)/n\sqrt{2}],$$

the superposition obtained within an nth root of A number of steps, where A is any complex number of the form a+bi, where a and b are real numbers, and where i is an imaginary unit, with the property $i^2 = -1$; where such a superposed intialization provides a basis for massively parallel quantum computation, enabling combined sequential and simultaneous processing, generating a conditional basis for massively parallel calculation of a plurality of computational trajectories, pathways, and outcomes.

4. A system as recited in claim 1 for calculating a quantum addressable absolute memory index (AAMI) in the form:

$$AAMI = \prod_{i=0}^{n} Y_i \left[ \int \int \int \ldots \int_D f(x_1, x_2, \ldots, x_n) dx_1 dx_2 \ldots dx_n \right];$$

where:

$$\left[ \prod_{i=0}^{n} Y_i \right]$$

is the Cartesian product of the set of all (n+1)-tuples $(y_0, \ldots, y_n)$;

[$\iiint \ldots \int$] is an n-dimensional indefinite/unbounded integral;

[($x_{n-5}$=c=quantum memory cell)];
[($x_{n-4}$=s=spin quantum number)];
[($x_{n-3}$=m=magnetic quantum number)];
[($x_{n-2}$=l=azimuthal quantum number)];
[($x_{n-1}$=n=principal quantum number)]; and
[($x_n$=w=$E_8$ quantum number)];

and where AAMI comprises an n-level quantum system based upon a plurality of projective space vectors from the Poincaré sphere (quantum photonic expression), and Bloch sphere (quantum electronic expression), operating within n-dimensional Hilbert space.

5. A system as recited in claim 4 for:
identifying quantum numbers of spin-polarized electrons;
identifying fermionic quantum numbers, where fermions include any of electrons, protons, neutrons, neutrinos, quarks, or certain atomic structures;
storing quantum numbers of spin-polarized electrons;
storing fermionic quantum numbers, where fermions include any of electrons, protons, neutrons, neutrinos, quarks, or certain atomic structures;
associating a plurality of quantum numbers to a plurality of particles, at a plurality of scales, to a plurality of quantum memory cells, where the set of quantum numbers specifies the complete and unique quantum state of each particle functioning as a particular quantum memory cell, and where the combination of any given particle quantum number set is associated with any given unique quantum memory cell; and
associating particle states to wave functions.

6. A system as recited in claim 1, wherein the rotation operators are integer values.

7. A quantum search oracle computer in a distributed computing environment comprising:
a processor coupled with memory storage devices and hardware operative to:
utilize zero-point quantum computation, search, storage and retrieval logic within a plurality of superposed quantum gaps, or computational singularities in the hardware;
perform internally state-continuous quantum computation while stationed between and among any 2-to-n instances of a plurality of observable system states in the hardware;
marks, by the processor a plurality of solutions to a plurality of quantum search query requests by phase-shifting search request solutions utilizing zero-point, self-referral computations' in quantum gap logic at hyper-exponentially convergent calculation velocities, where the search problem contains a plurality of N possible items and a plurality of M possible solutions;
solves, by the processor, a quantum search problem searching for the N possibilities; and
generate, by the processor a quantum oracle index upon completion of the quantum search solution mark process.

8. A quantum search, computation, and retrieval system in a distributed computing environment having a plurality of clients, a server and memory devices comprising:
a plurality of mapping indices between and among a plurality of real-, complex-, and quaternion-based computations and representations;
a Wavefunction $\Psi(x)$ initialization at uniform superposition, stored in the memory devices with equal amplitudes in all basis states and where sums of entries in initialization matrix columns are unity;
a plurality of computational and search arguments and parameters stored in the memory devices that propel a quantum, massively parallel search along n-dimensional, massively interlinked computational pathways;
a quantum search query module stored as an instruction set in the memory devices that formats and presents a plurality of quantum search query requests to a quantum oracle index;
a quantum oracle index stored in the memory devices that invokes a quantum search oracle;
a plurality of $E_8$ roots and cells stored in the memory devices and mapped to a plurality of quantum root memory cells stored in the memory devices;
a rotation operator module stored as an instruction set in the memory devices to associate a plurality of basis state phase shift rotations by $\pi$ radians to a plurality of root memory cells; phase-shift marked basis state search matches by rotations of $2\pi$ radians; phase-shift unmarked basis state search matches by rotations of $3\pi/2$ radians; phase-shift a plurality of marked and unmarked basis state computational and search matches by a plurality of infinitesimal increments of rotations of [$-\infty \leq \pi \leq \infty$ radians]; associate a plurality of marked rotations ($2\pi$-to-n$\pi$-radians) and unmarked rotations ($3\pi/2$-to-n$\pi$/n-radians), with a plurality of quantum search indices utilizing an nth root algorithm, where a plurality of radicands is enabled, approaching an infinite root number of steps at exponentially or hyper-exponentially convergent calculation velocities; associate a plurality of marked rotations ($2\pi$-to-n$\pi$-radians) and unmarked rotations ($3\pi/2$-to-n$\pi$/n-radians), with a plurality of locations on an absolute addressable memory index; associate a plurality of infinitesimal increments of phase-shifted rotations of [$-\infty \leq \pi \leq \infty$ radians] to a plurality of locations on an addressable absolute memory index;
a method to initialize subsequent named computational search sets [$S_{n+1} \rightarrow S_\infty$] on $E_8$ roots and cells that are directly mapped to a plurality of root memory cells:,
a spin matrices module stored as an instruction set in the memory devices where spin-polarized particle results from marked and unmarked rotations generate and apply n-vector extensions to a plurality of spin matrices;

a rotation matrices module stored as an instruction set in the memory devices that generates a plurality of spin-polarized particle rotation matrices;

a quantum number module stored as an instruction set in the memory devices that initializes root memory cell map index matrices, calculates a plurality of root system, principal, azimuthal, magnetic, and spin quantum numbers;

an integrated world sheet root system and root memory cells module stored as an instruction set in the memory devices that: initializes nth-root search logic approaching infinite root at hyper-exponentially convergent calculation velocities: initializes cartan sub-algebra generators; generates a strong $G_2$ root system; rotates and scales in n-dimensions; matches on parallel world lines; collapses a $G_2$ root system to lower-dimensional embedded space; generates a plurality of graviweak $F_4$ vertices a quantum number; generates a plurality of gravitation and electroweak $D_2$ vertices; calculates a plurality of $E_8$ polytope vertices; calculates an $E_8$ quantum number; combines a plurality of $E_8$ roots in eight dimensions; collapses an $E_8$ root system along matched parallel world lines and lattices to lower-dimensional embedded space; calculates a plurality of $E_8$ root systems along mapped world lines; calculates collapsed n-dimensional $E_8$ root system projections; and maps to a plurality of root memory cells;

a quantum encryption module stored as an instruction set in the memory devices that performs quantum encryption and decryption;

a content mapping module stored as an instruction set in the memory devices that formats, maps, and returns a plurality of quantum search query request indexes into a quantum search results list across a quantum application programming interface; and an integrated classical crawler module stored as an instruction set in the memory devices, classical page repository, classical search indexes, and classical search query ranking module stored as an instruction set in the memory devices that processes a plurality of search query requests and formats a plurality of search results within a classical search system and via interface to a quantum search system.

9. A quantum search, computation and retrieval system in a distributed computing environment having a plurality of clients, a server and memory devices comprising:

a source of spin-polarized particles;

a Wavefunction $\Psi(x)$ initialization at uniform superposition, stored in the memory devices with equal amplitudes in all basis states and where sums of entries in initialization matrix columns are unity;

a Quantum logic initialization stored in the memory devices for a named search sets wavefunction time to zero, where $[(t=0) \Psi(x)]$ is an eigenstate of a Hamiltonian (H), a self-adjoint operator acting on a state space to initialize computational energy as a physically observable (real number-based) quantity=N which is associated with a named computational search set=$S_n$;

a plurality of computational and search arguments and parameters stored in the memory devices that propel a quantum, massively parallel search along n-dimensional, massively interlinked computational pathways;

a quantum search query module stored as an instruction set in the memory devices that formats and presents a plurality of quantum search query requests to a quantum oracle index;

a quantum oracle index stored in the memory devices that invokes a quantum search oracle;

a plurality of $E_8$ roots and cells stored in the memory devices and mapped to a plurality of quantum root memory cells stored in the memory devices;

a rotation operator module stored as an instruction set in the memory devices to associate a plurality of basis state phase shift rotations by $\pi$ radians to a plurality of root memory cells; phase-shift marked basis state search matches by rotations of $2\pi$ radians; phase-shift unmarked basis state search matches by rotations of $3\pi/2$ radians; phase-shift a plurality of marked and unmarked basis state computational and search matches by a plurality of infinitesimal increments of rotations of $[-\infty \leqq \pi \leqq \infty$ radians]; associate a plurality of marked rotations ($2\pi$-to-n$\pi$-radians) and unmarked rotations ($3\pi/2$-to-n$\pi$/n-radians), with a plurality of quantum search indices utilizing an nth root algorithm, where a plurality of radicands is enabled, approaching an infinite root number of steps at exponentially or hyper-exponentially convergent calculation velocities; associate a plurality of marked rotations ($2\pi$-to-n$\pi$-radians) and unmarked rotations ($3\pi/2$-to-n$\pi$/n-radians), with a plurality of locations on an absolute addressable memory index; associate a plurality of infinitesimal increments of phase-shifted rotations of $[-\infty \leqq \pi \leqq \infty$ radians ] to a plurality of locations on an addressable absolute memory index;

a method to initialize subsequent named computational search sets $[S_{n+1} \rightarrow S_\infty]$ on $E_8$ roots and cells that are directly mapped to a plurality of root memory cells;

a spin matrices module stored as an instruction set in the memory devices where spin-polarized particle results from marked and unmarked rotations generate and apply n-vector extensions to a plurality of spin matrices;

a rotation matrices module stored as an instruction set in the memory devices that generates a plurality of spin-polarized particle rotation matrices;

a quantum number module stored as an instruction set in the memory devices that initializes root memory cell map index matrices, calculates a plurality of root system, principal, azimuthal, magnetic, and spin quantum numbers;

an integrated world sheet root system and root memory cells module stored as an instruction set in the memory devices that: initializes nth-root search logic approaching infinite root at hyper-exponentially convergent calculation velocities; initializes cartan sub-algebra generators; generates a strong $G_2$ root system; rotates and scales in n-dimensions; matches on parallel world line's; collapses a $G_2$ root system to lower dimensional embedded space; generates a plurality of graviweak $F_4$ vertices a quantum number; generates a plurality of gravitation and electroweak $D_2$ vertices; calculates a plurality of $E_8$ polytope vertices; calculates an $E_8$ quantum number; combines a plurality of $E_8$ root in eight dimensions; collapses an $E_8$ root system along matched parallel world lines and lattices to lower-dimensional embedded space; calculates a plurality of $E_8$ root systems along mapped world lines; calculates collapsed n-dimensional $E_8$ root system projections; and maps to a plurality of root memory cells;

a quantum encryption module stored as an instruction set in the memory devices that performs quantum encryption and decryption;

a classical encryption module stored as an instruction set in the memory devices that performs industry-standard classical (non-quantum) encryption, decryption and interfaces;

a steganographic encryption module stored as an instruction set in the memory devices that performs steganographic encoding of a plurality of quantum and classical encryption operations;

a content mapping module stored as an instruction set in the memory devices that formats, maps, and returns a plurality of quantum search query request indexes into a quantum search results list across a quantum application programming interface;

an integrated classical crawler module stored as an instruction set in the memory devices, classical page repository, classical search indexes, and classical search query ranking module stored as an instruction set in the memory devices that processes a plurality of search query requests and formats a plurality of search results within a classical search system and via interface to a quantum search system.

10. A quantum search, computation, and retrieval system as recited in claim 9 that generates a quantum search index of the form $0 \leq$ element index $\leq N-1$ to N search elements, $N=2^n$; where the quantum search index can be stored in n qubits, an associated quantum search problem has M solutions with $1 \leq M \leq N$, the quantum search index obtains a search solution utilizing an exponentially or hyper-exponentially converging nth root algorithm for finding an nth root of A, where A is any complex number of the form a+bi, where a and b are real numbers, where i is an imaginary unit with the property $i^2=-1$, and where a radical or root may be encoded by an infinite series:

$$(1+x)^{s/t} = \frac{\sum_{n=0}^{\infty}(s+t-kt)}{(s+t)n!t^n}x^n$$

with $|x| < 1$.

11. A quantum search, computation, and retrieval system as recited in claim 9 that associates with, and encodes to, a plurality of Lie groups, the Lie groups being differentiable manifolds with the property that group operations are compatible with a continuous-symmetry smooth structure, i.e., continuous symmetries of differential equations;

associating a plurality of spin states with local or linearized, versions of a global quantum computational object with its infinitesimal group, based on Lie algebra;

comprising a plurality of root vectors and a plurality of Cartan subalgebra generators that span the Lie algebra and, in so doing, can function as generators—the Cartan-Weyl basis of the Lie algebra, where the Lie bracket between root vectors corresponds to vector addition between their roots, and to interactions between quantum memory address locations stored in the memory devices;

where eigenvectors function as weight vectors of the Cartan subalgebra, with eigenvalues that correspond to the generalized roots (weights) that describe a plurality of representations; comprising a plurality of canonical forms for the commutation relations of a Lie algebra, where resulting equations are invariant under the nonsingular transformation U, and where the canonical form is a polynomial in $\lambda$ of order $\eta$, with real coefficients $\phi_j(r^j)$, depending on the choice of Lie algebra element; and comprising a means to generate and store a plurality of Lie brackets within a plurality of Lie groups as a function of equivalent operators of a subgroup of vectors in fundamental representation spaces, based upon a plurality of superposed quantum gaps, or computational singularities, stationed between and among any 2-to-n instances of a plurality of observable system states.

12. A quantum search, computation, and retrieval system as recited in claim 9 further comprising a means to cross-associate and cross-integrate quantum search and retrieval initialization, time-series evolution, and results, within and among a plurality of classical, non-quantum systems as a function of a plurality of addressable classical memory components existing within a quantum memory system.

13. A quantum search, computation, and retrieval system as recited in claim 9 further comprising:

a plurality of spin-polarized electrons or spin-polarized photons generated and expressed as a plurality of spin slopes and spin slope fields;

a first means to achieve long storage times of representations of spin polarization, based upon construction of a plurality of slope fields associated with a plurality of spin-polarized states, expressed as differentiable functions computed at n-dimensional cartesian coordinate-based points of spin-polarized near-tangency;

a second means to generate autonomous differential equations, yielding horizontal-shift-invariant slope fields;

a third means to generate nonautonomous differential equations yielding horizontal- and vertical-shift-variant slope fields;

a fourth means to associate a plurality of nonautonomous differential equation-based slope fields to a plurality of spin-polaorized electronic, and to a plurality of spin-polarized photonic states;

a fifth means to represent a plurality of spin-polarized electronic and a plurality of spin-polarized photonic states, to a plurality of autonomous and nonautonomous differential equation-based slope fields;

a sixth means to generate a plurality of solution curves to a plurality of autonomous and non-autonomous differential equation-based representations of spin-polarized electronic and photonic states, where convergence regions generate addressable and reusable quantum search index identifiers; and a seventh means to associate a plurality of quantum numbers to a plurality of quantum memory cells, where the associated set of quantum numbers specifies the complete and unique quantum state of each particle functioning as a particular quantum memory cell stored in the memory devices.

14. A quantum search, computation, and retrieval system as recited in claim 13, further comprising a plurality of spin state-vectors imparted with n-dimensional components via operators on n-directional photonic oscillating magnetic field and electric field parallel and perpendicular alignments, where spin decoherence is contained by minimizing duration of optical pulse and storage times, and wherein the first through seventh means are a quantum computer.

15. A quantum cryptosystem of the quantum search, computation, and retrieval system as recited in claim 9, wherein qubits are established via the oscillating polarization generated as a function of the time-varying electric field of a light wave where the relationship between the polarization and applied electric field is linear, with the resulting time-varying polarization sinusoidal at frequency $\omega_1$ through $\omega_n$;

wherein sinusoidally-varying fields are generated for any medium in which induced polarization is a nonlinear function of any electric field, inducing polarizations that incorporate frequency components at 1-to-n higher harmonics of the original (first-order, or linear) frequency, generating the basis for 1-to-n qubit encryption; where $\Sigma$-frequencies of second-to-nth-order harmonic waves expressing as qubits are calculated using perturbations of Maxwell's equations for static and time-varying electric and magnetic fields, and where computational reversibility may be calculated through an Inverse Fourier Transform on any classical (non-quantum) function $f(x)$.

16. A quantum cryptosystem of the quantum search, computation, and retrieval system as recited in claim 9, wherein computational reversibility can be calculated through a Quantum Fourier Transform as the discrete Fourier transform with a specified decomposition into a product of simpler unitary matrices, and where the decomposition and associated decryption can be implemented as a quantum logic gate.

17. A quantum cryptosystem of the quantum search, computation, and retrieval system as recited in claim 9, wherein the relationship between induced polarization P and the electric field E is not linear; qubits are established as a result of the generated polarization not being the same for a given applied field of magnitude $+E_0$, in the same fashion as for an applied field of magnitude $-E_0$; and the polarization response to any given applied sinusoidal field is not purely sinusoidal, generating a distortion reflecting the presence of polarization components at frequencies $\neq \omega_1$, and therefore providing the basis state for a strong component at the second-harmonic frequency $2\omega_1$ or nth-harmonic frequencies $2\omega_n$.

18. A quantum cryptosystem of the quantum search, computation, and retrieval system as recited in claim 9, wherein sender-receiver parties rotate Einstein-Podolsky-Rosen (EPR) quantum key-generating pairs $[(|00\rangle + |11\rangle)/\sqrt{2})]$ by 1-to-n spin-polarized phase angles ($\theta$) throughout the integer and/or sub-integer range $0 \leq \theta \leq 360$.

19. A quantum cryptosystem of the quantum search, computation, and retrieval system as recited in claim 9, wherein quantum cryptographic algorithms, keys, and references thereto, are steganographically encoded and referenced within classical fields protected by n-bit keys, and references thereto, based on steganographically embedding 1-to-n quantum cryptographic algorithms, keys, and references thereto, within 1-to-n classical fields, and references thereto, comprising the following steps:

(1) Initializing the sequence by encoded reference to quantum computational results, resulting in generation of non-orthogonal qubits;

(2) Generating a non-orthogonal qubit result reference field comprising 1-to-n classical bits;

(3) Generating a pseudo-random key sequence using a classical (non-quantum) XOR operation;

(4) Encrypting the XOR pseudo-random result employing a commutative one-way accumulator;

(5) Pseudo-randomly interspersing check bits among (classical) data bits;

(6) Embedding reference (classical) check bits to calculated non-orthogonal qubits and references thereto; and (7) embedding classical data referenced by classical check bits into variable-length message data and overhead fields.

20. A quantum cryptosystem as recited in claim 19 that employs a reversible computational method to the method for retrieving 1-to-n embedded quantum cryptographic algorithms, keys, and references thereto, from 1-to-n classically encrypted fields, and references thereto.

21. A quantum cryptosystem as recited in claim 19 wherein classical (non-quantum) data fields protected by n-bit keys, and references thereto, are steganographically encoded and referenced within quantum cryptographic algorithms, keys, and references thereto.

22. An integrated classical (non-quantum)-quantum cryptosystem of the quantum search, computation, and retrieval system recited in claim 19 that steganographically embeds 1-to-n classical (non-quantum) cryptographic algorithms, keys, and references thereto, within 1-to-n quantum cryptographic algorithms, keys, and references thereto, comprising the following steps:

(1) Initializing the sequence by encoded reference to classical (non-quantum) encryption algorithms and keys;

(2) Generating a random quantum key sequence resulting in non-orthogonal qubits;

(3) Calculating a spin-polarized phase angle pointer to 1-to-w classical (non-quantum) cryptographic algorithms and keys;

(4) Calculating the associated inner product $\langle \phi | \Psi \rangle$ between the vectors $|\phi\rangle$ and $|\Psi\rangle$;

(5) Calculating the associated tensor product $|\phi\rangle\langle \hat{x} | \Psi \rangle$ of $|\phi\rangle$ and $|\Psi\rangle$;

(6) Embedding reference quantum check qubits to calculated classical (non-quantum) cryptographic algorithms, keys, and references thereto; and (7) Embedding the quantum computational result into the transmitted quantum message.

23. An integrated classical (non-quantum)-quantum cryptosystem as recited in claim 22 that employs a reversible computational method to the method for retrieving 1-to-n embedded classical (non-quantum) cryptographic algorithms, keys, and references thereto, from 1-to-n quantum encrypted fields, and references thereto.

* * * * *